(12) United States Patent
Nazarathy et al.

(10) Patent No.: US 6,490,727 B1
(45) Date of Patent: Dec. 3, 2002

(54) DISTRIBUTED TERMINATION SYSTEM FOR TWO-WAY HYBRID NETWORKS

(75) Inventors: Moshe Nazarathy, Haifa (IL); Adi Bonen, Vered (IL); Ilan Kepten, Tel-Aviv (IL); David Piehler, Half Moon Bay, CA (US)

(73) Assignee: Harmonic, Inc., Sunnyvale, CA (US)

( * ) Notice: Subject to any disclaimer, the term of this patent is extended or adjusted under 35 U.S.C. 154(b) by 0 days.

(21) Appl. No.: 09/414,979

(22) Filed: Oct. 7, 1999

(51) Int. Cl.[7] ............................. H04N 7/173; H04N 7/16
(52) U.S. Cl. ..................... 725/129; 725/127; 725/148; 725/149
(58) Field of Search ................................. 725/121, 122, 725/126, 129, 98, 118, 119, 148, 111, 105; H04N 7/173, 7/16

(56) References Cited

U.S. PATENT DOCUMENTS

| | | | | |
|---|---|---|---|---|
| 5,528,582 A | * | 6/1996 | Boodep et al. | 370/276 |
| 5,659,351 A | * | 8/1997 | Huber | 725/101 |
| 5,719,872 A | * | 2/1998 | Dubberly et al. | 114/362 |
| 5,765,097 A | * | 6/1998 | Dail | 725/125 |
| 5,818,825 A | * | 10/1998 | Corrican et al. | 370/329 |
| 5,861,966 A | * | 1/1999 | Ortel | 359/125 |
| 5,878,325 A | | 3/1999 | Dail | |
| 5,963,557 A | * | 10/1999 | Eng | 370/432 |
| 6,028,860 A | * | 2/2000 | Laubach et al. | 370/395.64 |
| 6,147,786 A | * | 11/2000 | Pan | 359/124 |
| 6,271,946 B1 | * | 8/2001 | Chang et al. | 359/124 |
| 6,327,709 B1 | * | 12/2001 | Ovadia et al. | 725/124 |
| 2001/0055319 A1 | * | 12/2001 | Quigley et al. | 370/480 |

* cited by examiner

Primary Examiner—Andrew Faile
Assistant Examiner—Vivek Srivastava
(74) Attorney, Agent, or Firm—Skjerven Morrill LLP; Norman R. Klivans

(57) ABSTRACT

In hybrid fiber coaxial cable networks such as used in cable television where two-way digital communications are desired, a distributed termination system is provided. In such a system the home terminals are digital terminals, such as digital set-top boxes or cable modems using bi-directional transmission standards. The functionality of the head end controller in a conventional system is in this system distributed between the head end and the fiber nodes which link the coaxial cable and optical fiber portions of the system. Thereby the upstream detection takes place in the fiber nodes rather than in the head end by placing upstream burst receivers in the fiber nodes. Further there is a distributed method to enable this by providing synchronization and calibration control between the head end and the fiber nodes. Also, the return path is a digital return path supported by having the burst receivers located in the fiber nodes.

5 Claims, 25 Drawing Sheets

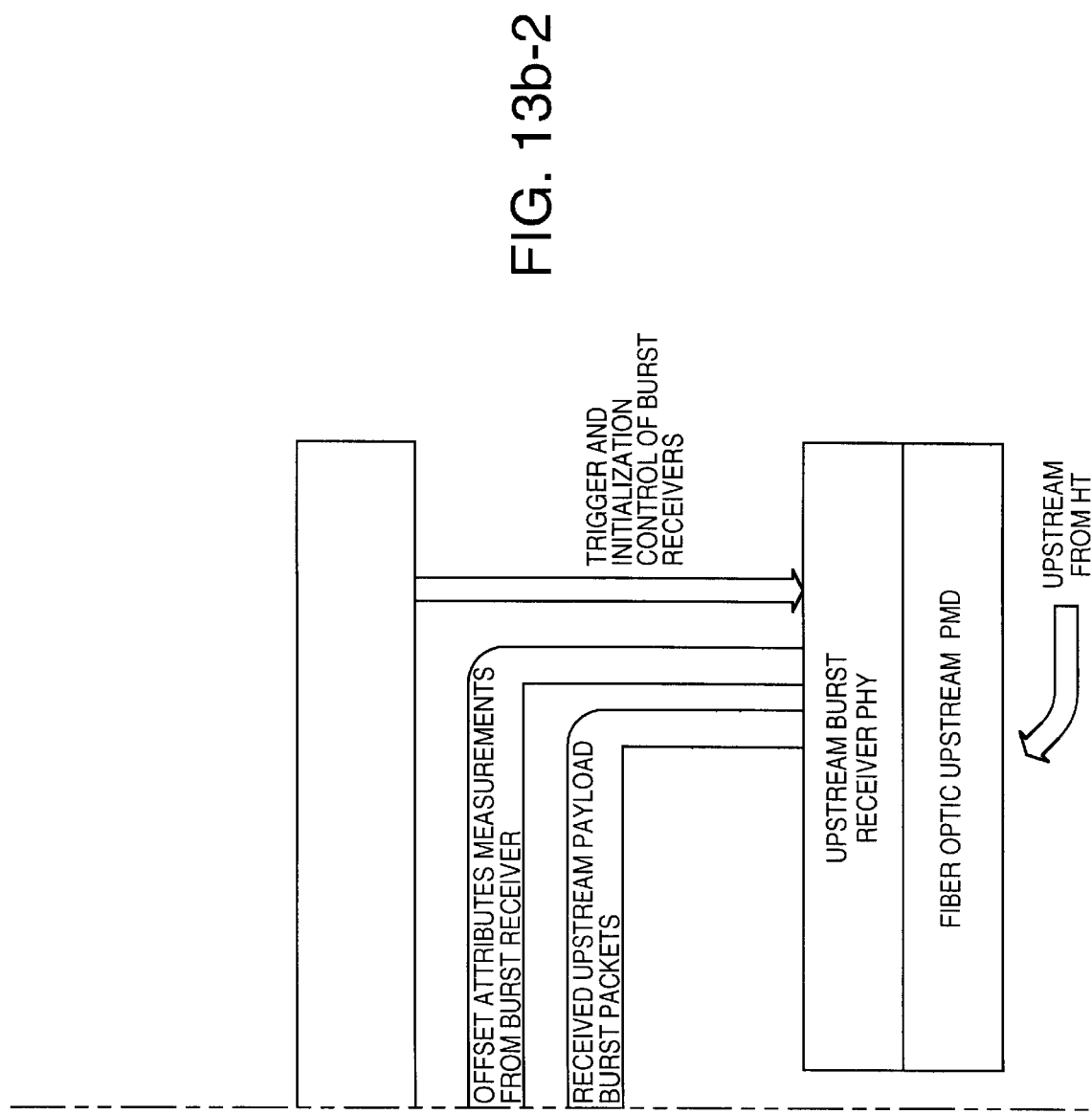

DISTRIBUTED TERMINATION SYSTEM FOR TWO-WAY HYBRID NETWORKS

FIELD OF THE INVENTION

This invention pertains to RF and fiber-optic architecture of HFC (Hybrid Fiber Coaxial cable) cable television or cable-like network systems and two-way digital communications to cable modem and digital settop units.

BACKGROUND

HFC Networks

FIGS. 1a, 1b show a generic HFC network. FIG. 1a shows the head-end whereas FIG. 1b shows the entire network.

The Head-end (HE) 8 contains the equipment respectively 10, 12 and 14 that receives the analog and digital television signals and the digital data signals from multiple local and remote sources (satellites, off-air sources, terrestrial microwave, local tape systems, local video servers, computer servers, IP routers) and conditions these signals for transmission to the home terminals (HT). The home terminals 18-1, 18-2, etc., are analog and digital video "settops" (cable TV set top boxes) and digital cable modems. The head end 8 also receives the reverse (upstream) transmissions from the home terminals and processes them, in coordination with the downstream transmissions and the input/output signals from/to outside digital networks. The equipment to perform this transceiving function at the HE with respect to the home devices and the core data networks connected to the HE is called in this disclosure Interactive Termination System (ITS).

Consider first the downstream transmission of analog video, then the transmission of digital video and data. Analog video is transmitted downstream by FDM (Frequency Division Multiplexing), whereby a composite spectrum consisting of multiple analog channels is generated by RF (radio frequency) combining the output of analog modulators 20-1, 20-2, etc., each of which is driven by a baseband or IF analog video channel. The composite FDM signal is then applied to one or more linear analog laser transmitters 24-1, 24-2, 24-3, etc., and transmitted over a "tree" structure 28 of optical fiber to the fiber nodes 30-1, 30-2, etc., where conversion from optical to RF format occurs at optical receiver 29.

From the fiber nodes the signals are distributed to the home terminals via a tree and branch structure 40 consisting of coaxial cables with amplifiers 42-1, 42-2, etc., periodically placed to make up for the signal loss, taps and coaxial drops to the subscriber units HT. Each coaxial cable drop terminates in an RF set-top converter HT which bandpass selects a particular analog television channel out of the composite spectrum.

The band from 550 MHz to 750 MHz is used for downstream digital transmission from digital TV sources 12. Digital QAM (quadrature amplitude modulation) modulators 50-1, 50-2, 50-3, etc., are used to map multiple streams, each of several tens of Mbps into 6 MHz channels. The modulators 50-1, etc., are positioned at the transmit side of a digital link, which runs over an analog linear medium, such as the HFC medium. The digital input to each QAM modulator at the HE is typically an MPEG-2 multiplexed digital signal carrying multiple digital video MPEG-2 programs and/or data channels from multiplexes 52-1, 52-2, 52-3, etc.

The digital video inputs to the multiplexers 52-1, 52-2, etc., are generated by digital video encoders in sources 12 each of which digitizes and compresses an analog video input signal. Alternatively the digital video input signals originate from digital video servers or are received from remote sources via satellite. On the transmit side, an RF summing/splitting matrix 53 combines the RF signals carrying analog TV, digital TV, and data signals; the data signals are provided from the ITS via modulators 55-1, 55-2, etc.

The coaxial cable path is used for return (upstream) as well as for forward (downstream) transmission. The 5 to 42 MHz band (used in the US) and the corresponding range in international cable systems, called here the lowband, is dedicated to the upstream transmission. Home terminals HT such as cable modems and interactive digital video settops, in addition to receiving downstream digital transmissions by means of their QAM demodulators, also have the ability to map their digital return transmissions onto RF waveforms using upstream burst transmitter modulators. Modulation formats such as QPSK or 16-QAM are typically used, however in the return path the transmission is not of a continuous bitstream as in downstream but rather occurs in bursts of short packets of data randomly occurring in time. The data bursts at the home terminals HT are encoded into short sequences of symbols by the QPSK or 16-QAM burst transmitter modulator (called here a burst transmitter). After upstream propagation all the way up to the head-end 8, these bursts are converted by QPSK or 16-QAM burst receiver demodulator (called here a burst receiver) into the original data packets. This process which is called detection occurs in the front end of the ITS 56-1, 56-2. Several burst receivers may be used with the corresponding number of upstream channels, each receiving packets over a single upstream channel frequency. Each upstream channel frequency may be shared by many home terminals, by TDMA (Time-Division Multiple Access) as arbitrated by the ITS at the head-end.

In the return path, RF return signals from the home terminals HT propagate back towards the head-end 8, going back up the drop, the tap in tree 40, and back through the amplifiers 42-1, etc., which have bidirectional capabilities to support the return path. When the return signal reaches the fiber node 30-4 it is diplexed by diplexer 59 (i.e., directed on a separate upstream path based on the orthogonality of the upstream and downstream frequency bands) amplified and applied to a return optical transmitter 58 and transmitted back up to the head-end, typically on a separate optical fiber than the one used for downstream transmission.

At the head-end 8 the return signal is photodetected in a return-path-receiver 60-1, 60-2, i.e. converted back to electrical (RF) form, and is then split at RF summing/splitting matrix 68 and fed to analog or digital receivers for the various return service applications, in particular, it is input into the return path demodulators 64-1, 64-2.

High performance broadband HFC networks are essentially broadcast networks. To increase the capacity, a combination of a digital switching network and a multiplicity of smaller scale broadcasting subsystems can be employed, whereby the subscriber population is partitioned into multiple sets, with each set of subscribers being allocated one switched bi-directional digital data stream, such that different streams belonging to different subscriber sets are generally independent. This narrowcasting architecture essentially consists of a master switched system or network, with the switch ports driving smaller scale HFC broadcast, each addressing a serving area of a few tens or hundreds of subscribers called the narrowcasting domain. Domain-specific digital content, namely, two-way interactive data and interactive digital video, namely VOD (Video-On- Demand) is routed or switched to/from each domain via the HE or multiple hubs. One can differentiate between downstream and upstream narrowcast domains.

As subscriber penetration increases it is necessary to develop methods to efficiently concentrate the return path signals from large number of subscribers all the way to the head-end, while maintaining small upstream narrowcast domains. This is done by segmenting the HFC system into a larger number of return path domains, associating a smaller number of subscribers with each return path transmitter at the node. This is beneficial with respect to the ingress noise accumulation but also increases the upstream bandwidth per subscriber.

The relationship between downstream and upstream narrowcast domains is as follows. The relevant factors in determining the optimal ratio of the upstream and downstream domain sizes are digital transport capacity in the downstream and upstream (a function of the spectra available and the spectral efficiency), and the asymmetry profiles in the upstream vs downstream average transmission rates required per subscriber. For example, it is given that only 37 MHz of bandwidth are available in the downstream and the modulation scheme there (QPSK or 16-QAM) is less spectrally efficient than in the upstream (QAM-64 to QAM-256). Since more bandwidth is available downstream than upstream (though this depends on the utilization of the downstream bandwidth between analog and digital broadcast vs narrowcast), and since the traffic is asymmetric with more bandwidth required downstream, it follows that the downstream narrowcast domains should be larger than the upstream narrowcast domains. It is desired to have the size of the downstream and upstream narrowcast domains decoupled. One way of manipulating the size of narrowcast domains is to design the system in the first place with small and equal downstream/upstream domains and to RF combine the upstream and downstream transmissions.

Once the digital capacity of the fixed return path portion of the spectrum (e.g. 5 to 42 MHz in the US, with each 3.2 MHz carrying 5 Mbps in QPSK and 10 Mbps in QAM16 modulation) is divided among fewer subscribers, not only does the bandwidth per subscriber increase, but also the lower noise may allow using more spectrally efficient modulation schemes such as QAM16 rather than QPSK. The challenge is to reconcile this with the trend of eliminating switching equipment (ITS and video on demand VOD) from the hubs and bringing all the returns from tens of thousands of subscribers back to a master head-end. One must then collect return signals from a minimal number of RF branches, while devising methods to transmit those returns in some efficient multiplexed way back to the head-end.

Known alternatives for a high performance broadband return path include space-division multiplexing using multiple fiber return paths; frequency stacking using an FDM return path; dense wavelength division mutiplexing at an optical fiber node in the return path; time division multiplexing in the return path; and PCM (pulse code modulation) for a digital return path.

Dail U.S. Pat. No. 5,878,325, discloses shifting the point of detection of the analog waveforms which encode the upstream digital communication, away from the head-end and into a fiber node (where optical RF conversion takes place).

In an example of partitioning the 2000 homes node into four return paths each covering 500 homes, four groups of return demodulators may be used in the fiber node, each group listening to the FDM channels allocated on each of the four RF coaxial cable legs. The digital outputs from these return demodulators are Time Division Multiplexed at the node into a single digital stream. A digital baseband link running over fiber optics should then be provided from the fiber node to the head-end.

This is very efficient. If QPSK is used then the spectral efficiency is approximately 1.5 bits/sec per Hz, i.e. less than 1.5 B bits are required to carry the upstream QPSK transmissions partially filling a return bandwidth of B Hz.

Multiple Access Arbitration in Digital HFC Networks

HFC media are broadcast, such that transmissions from the head-end are received by every HT, and conversely return transmissions from the HTs may superimpose upon one another when they reach the head-end.

The most natural design for the multiple access in cable systems uses centralized management from the head-end, which becomes the "master", with the home terminals HT becoming "slaves", in the sense that the master decides when a slave is allowed to send data. The head-end is then a single point of coordination.

The critical layer for interactive communications with HTs such as cable modems and settops is the head-end MAC (Medium Access Control) layer, used to arbitrate access of multiple users. This layer is located between the physical layer and the higher application-oriented layers. There are multiple choices for the implementation of the MAC layer. Given that the propagation delays from the head-end to the home terminals are typically much larger than the durations of packets, it follows that distributed contention based MAC schemes such as ALOHA or CSMA/CD (Ethernet) would be very inefficient. Instead a class of protocols which are called here reservation based limited contention protocols are used.

These protocols combine the best properties of collision-free and contention-free protocols, i.e. using contention at low loads to provide low delay, while using a collision-free polling technique at high load to provide high throughput.

In particular, the preferred choices for the MAC implementation for HFC systems are Reservation Based Limited Contention Hybrid FDMA/Slotted-TDMA HFC schemes, referred to here as RBLC-HFC schemes.

Relevant established standards (or standards in the making) are DOCSIS, DVB-RC, DAVIC, IEEE 802.14, and OpenCable. The most widespread and mature standards are the first two. The DOCSIS standard was originally called MCNS and the DVB-RC standard was adopted from a prior standard called DAVIC (Digital AudioVisual Council).

The IEEE 802.14 standard seems to be failing to become widely adopted. Finally, a new North American standard for set-tops called OpenCable is in the making, and is likely to include the DAVIC and DOCSIS standards as a subset.

Therefore this disclosure focuses on the DOCSIS and DVB standards as the most widespread, and best exemplifying the generic features of all standards for broadband communication over HFC networks, that are based on the RBLC-HFC protocol, whereby the home terminals use a combination of reservation and contention techniques to establish broadband bi-directional communications with the head-end. These standards support different access modes for upstream data transmission.

While details of these the two main DOCSIS and DVB standards differ, for the purposes of this disclosure, the systems are described using a generalized nomenclature pertaining to both.

The Head-End ITS (Interactive Termination System) refers here to both CMTS (Cable Modem Termination System) and INA (Interactive Network Adapters) Head-End (HE) controllers which implement the MAC layer as well as the higher level application layers and the physical layer at the head-end.

DOCSIS Standard

The MAC frame formats for the DOCSIS standard are set forth in that standard, incorporated herein by reference. The following is a brief description of principles of operation of the standard.

The upstream channel is modeled as a stream of mini-slots along the time axis, the time reference for which is generated by the CMTS and communicated to all CMs. The CMTS arbitrates access to these slots by each of the cable modems. For example it may grant some number of contiguous slots to a CM for it to transmit some data or it may assign a number of slots for contention among stations that wish to transmit some data without having made prior reservations or it may allocate mini-slots to stations that communicated to the CMTS their wish to be allocated reserved bandwidth.

The DOCSIS MAC protocol governs the requesting, granting and using upstream bandwidth. An initial ranging and calibration procedure is first run such that new CMs be able to join the link and time their transmissions so that the CMTS receives these transmissions in the time reference intended by it.

DAVIC-RC Standard

There are two variants of the DVB-RC standard, the IB (in band) and OOB (out of band) methods. In both methods a QPSK return path is provided from the NIU (Network Interface Unit) which is the relevant subsystem in the home terminals, namely digital video settops and cable modems abiding by the DVB standard. The two variants differ in the provision of the interactive return path. Under the IB method the downstream control channel is transmitted over a QAM channel which can also multiplex digital video traffic. Under the OOB method a dedicated QPSK downstream channel is used for control and synchronization of the home terminals.

Interactive Termination System

FIG. 2 illustrates operation of a conventional ITS 56 system in the HE (head-end). The description of the internal structure of the ITS is generic, covering the common aspects of the DOCSIS and DVB-RC standards. FIG. 3 presents the internal structure of the INA in particular.

The timebase counter 80 is driven by an HE local clock (not shown) and synchronizes all the home terminals. In both standards timebase counter 80 actually generates two clock outputs, related to each other by a fixed integer ratio. The two related counter outputs are the sync count signal 82 and the scheduler count signal 84, such that a fixed number of counts of the scheduler count corresponds to a single count of the sync count.

In the DOCSIS standard the sync count is a 32 bit count driven by a 10.24 MHz clock, whereas the schedule count represents 6.25 $\mu$sec/64 divisions.

In the DVB-RC standard the sync count represents the count of ESFs (extended superframes) whereas the scheduler count is a finer count describing a finer subdivision of the duration of the extended superframe into regular time ticks. In the DVB standard a T1 type of framing, namely the extended superframe, is used for embedding payload and downstream overhead messages.

The sync count 82 is periodically embedded within downstream data stream. The downstream frame including the overheads and the sync message or sync bits is constructed by means of the Frame Mapper module 88, which in turns drives the physical layer modulator 90. In the DOCSIS standard the timestamps are embedded in separate SYNC messages, whereas in the DVB-RC standard the Sync count bits are embedded within the M1–M10 overhead bits of the extended superframes transmitted downstream which contain the actual payload as well as other encapsulated overheads called MAC flags.

The scheduler count 84 optionally is modified by a fixed calibration offset loaded in an offset accumulator 92 (supplied from CPU microprocessor 96) via adder 98 and then the resulting running time reading is compared by comparator 100 with the contents of a next arrival register 102 which indicates the expected time for the next arrival of a burst from one of the home terminals.

The values of the next arrival register are successively loaded from a queue 104 in the FIFO memory of the ITS processor 96. This queue 104 is generically called here schedule.

The schedule 104 is a data structure generated at the HE to be transmitted to all the HTs over a schedule_message. It indicates how to assign the time axis to the various HTs, by partitioning it into time intervals, each starting at the planned arrival time of packets or bursts from each of the HTs.

The schedule 104 consists of an ordered array of times when an arrival is due at the HE burst receiver (for each upstream channel and its associated burst receiver(s) one such schedule is maintained). It is communicated downstream by a related schedule_message, from which each HT may reconstruct a subset of the schedule containing an array of planned arrival times of bursts from that particular receiver. In the DOCSIS standard the schedule_message is called allocation_Map while in the DVB standard, the schedule_message consists of bits interspersed in the overhead of the extended superframe, namely the b0 ranging slot indicator and b1–b6 slot boundary definition MAC flags, as well as transmit opportunity assignments communicated in certain MAC messages such as the Connect_Message and the MAC_Reservation_Grant_Message.

When the scheduler running time count becomes equal to the contents of the next arrival register 102, a trigger pulse is generated by comparator 100 to indicate to a control input of the burst receiver 106 the expected time of arrival of the next burst.

In the reservation modes of operation the schedule 104 communicated to the HTs allows effective generation of a polling behavior, whereby each of the HTs in turn, in the order and at the timing determined by the structure of the schedule, transmit their packets in sequence. It is the responsibility of each HT to start transmitting at the proper allocated time (called transmit opportunity) as defined in the schedule. It is the responsibility of the HE to transmit a consistent schedule ahead of the intended transmission times for all the HTs. If all the HTs follow this procedure then it is ensured that only one HT transmits at a time and collisions are avoided while the available time for transmission is optimally utilized, without leaving idle intervals.

In order for this procedure to work, the arrivals of packets from the HTs to the HE must be first synchronized. To this end, upon initialization, a ranging protocol is executed insuring that the various delays from the HE to the home terminals are calibrated out by applying appropriate offsets to the local clocks of each HT. Once the ranging process is completed, time events indicated in the schedule may be interpreted in a literal way as both transmission times (according to each HT's local clock) as well as arrival times at the HE of the respective HT transmissions. It is then guaranteed that once the schedule indicates that a particular HT should transmit a packet at a certain (local) time $T_o$ then that packet indeed arrives at the HE at the same nominal time value $T_o$ (but referred to the HE clock). Therefore the schedule indicates the intended times of arrival of each packet at the head end, which, if literally interpreted by the home terminals as burst transmission times, will then coincide with the intended arrival times.

In the reservation mode the ITS assigns different home terminals to disjoint time intervals so that there are no collisions between the various transmissions. In the contention mode of operation, collisions are allowed, as certain time intervals are allocated to the simultaneous transmission of multiple home terminals. Contention is resolved by a back-off procedure whereby HTs randomly delay their to subsequent contention intervals to later times within the same contention interval.

The ranging procedure during initialization is itself executed in a contention mode, since more than one modem may attempt to join in by sending a message called RNG_REQ (Ranging Request) in the DOCSIS standard and Sign-on_Response in the DVB-RC standard. This message is generically called upstream_probe to cover both standards. The duration of the ranging interval is taken sufficiently long to allow for the differences in propagation time from the HTs to the HE. At this point, due to unknown propagation delays, the actual arrivals of the probe_message bursts from the HTs to the HE do not generally correspond to the head-end burst receiver trigger times which in turn correspond to the expected times of arrival as defined the schedule. However, the offset between actual and expected arrival times may be determined by the burst receiver which must have the capability to measure the time difference between the expected arrival as signaled by the burst receiver trigger and the actual arrival of the burst, and communicate this time offset to the ITS processor (CPU) 96.

This timing difference called timing_offset is equal to the total round trip propagation and processing delay, and stems from the delayed acquisition of the sync counter clock by the HTs as well as the delay between transmission of bursts at the HTs and their reception at the HE due to propagation and processing delays.

To complete the ranging process, once the timing_offset is measured by the HE burst receiver, it is communicated back to the HT by an overhead message which is called in the DOCSIS standard RNG_RSP (Ranging Response), while in the DVB-RC standard it is called Ranging_and_Calibration_Request message. Generically call this message downstream_calibration message here.

Each HT undergoing the ranging process is now able to correct its transmission clock accordingly by an amount equal to the timing_offset. This insures that future bursts transmitted by each HT now arrive at the ITS burst receiver precisely at the corresponding times of the receive triggers as derived from the schedule for each of the HT entries.

In addition to the timing trigger, the burst receiver 106 is also fed with estimates of the expected RF power for the next burst as well as the expected frequency of the next burst and it optionally (only in DOCSIS) measures the frequency response characteristics of the upstream channels for subsequent correction of equalization of the burst transmitter filter coefficients in the HT.

This necessitates the burst receiver to be equipped with the additional capabilities of a sophisticated measurement device for the ratio (difference on a decibel scale) of received RF power and expected RF power of the burst as well as for small frequency offsets between the intended and actual frequency of reception and the frequency response of the channel. These measurements, which together with the timing offsets are collectively called here offset_attributes, should also be communicated by the RNG_RSP to the HT in addition to the timing offset. Upon receipt of these offset_attributes the HT should correct the corresponding absolute parameters (time, power, frequency, equalization coefficients) by the received offset amounts, such that after the correction, a repetition of the measurement of these parameters by the burst receiver at the HE would eventually yield zero offsets. This procedure is performed at least once upon initialization or reset of the ITS and HT until the offset_attributes converge to zero, but it should also be repeated every once in a while to counteract the offset_attributes slowly drifting away from their null values due to environmental effects.

Burst buffer 108 receives the output signal from burst receiver 106 and couples it back to CPU 96, which in turn outputs the payload and MAC messages to the frame mapper 88.

FIG. 3 shows the INA for the DVB-RC standard, and is in many respects the same as FIG. 2. In FIG. 3, the timing circuitry is somewhat different, including a local clock 116 driving divider 118 and timebase counter 120. ESF counter 124 (ESF is DVB-RC nomenclature) couples to ESF frame mapper 128, as does buffer 132.

Home Terminals

A generic home terminal (HT) 18 is shown in FIG. 4 which applies to both standards. FIG. 5 shows a DVB-RC version of the FIG. 4 apparatus.

The frame recovery and parsing module 132 separates the incoming stream from demodulator 134 into substreams of payload bits and MAC overhead messages 136 as well as the sync timestamps 138 which are fed into a timestamp register 142 as they arrive (the timestamp register is called Upstream Position Register 143 in the DVB case).

The timebase recovery module 144 is a digital phase locked loop driving a local counter which tracks the samples of the timestamp register, smoothing any random rapid variable delays that may have been superimposed on the timestamp register readings along the way. The recovered count is called here local timebase. It lags the sync count timebase at the HE 82 by an amount of time equal to the propagation delay plus any processing delay in the frame and timebase recovery modules.

The local timebase is next additionally offset at adder 148 by a value stored in the offset accumulator 150 (from CPU 152), then it is compared with the reading of the next departure register 154, which is in turn loaded with the transmit opportunities times for the particular HT, as extracted from the schedule queue stored in memory 156. The schedule is extracted in advance out of appropriate overhead messages transmitted over the downstream broadcast channel by the HE to all associated HTs.

When the local timebase count becomes equal to the value stored in the next departure register, a pulse is generated in the comparator 160 and applied to the burst transmitter 162 to trigger the transmission of the next burst which was stored in buffer 166.

Subsequently, the next departure register 154 is updated by retrieving the next value out of the schedule queue 156, corresponding to transmission (and arrival) times of bursts from the particular HT. After the next time of transmission is loaded into the next departure register, the process is repeated.

The transmit and receive triggers at the HT and HE respectively, both occur when the running counts of the timebases at the respective locations become equal to the nominal value $T_o$ as specified in the schedule queue for the particular burst of the particular HT, but after ranging calibration the actual times when these two triggers tagged by the same nominal time $T_o$ occur, are in fact different such that the burst triggered at the HT by the trigger at local time $T_o$, is assured to arrive to the burst receiver at the HE concurrent with its burst receiver trigger, also at nominal time $T_o$ but measured with respect to the HE.

To grasp the timing relationships, notice that prior to execution of the ranging procedure the burst transmit trigger lags the burst receiver trigger by the total one-way delay. This means that the probe burst sent by the HT during ranging arrives at the HE burst receiver when it lags by the total round trip delay (with respect to the burst receiver pulse).

Advancing the burst transmit pulse by the round trip delay (twice the one-way delay) causes now the arrival at the pulse concurrent with the burst receive trigger at the HE.

This means that after ranging the burst transmit trigger at the HT now precisely advances the burst receiver trigger by an amount equal to the propagation delay from the HT to the HE plus any burst transmitter processing delay (total one-way delay).

FIG. 9 shows a DVB-RC version of the FIG. 8 home terminal, with similar elements similarly labeled. Here the demodulator 170 is a QPSK demodulator driving the ESF frame recovery module 172.

SUMMARY

This invention pertains to broadband HFC distribution systems to digital home terminals such as digital settops or cable modems, using bi-directional transmission standards such as DOCSIS and DVB, or more generally using any multiple access scheme characterized herein as of the Reservation Based Limited Contention Hybrid FDMA/Slotted-TDMA HFC (RBLC-HFC) type as described above. This allows application of the invention to future RBLC-HFC standards in addition to the existing DOCSIS, DVB-RC and IEEE 802.14 standards.

In conventional HFC systems all digital transmissions between the home terminals and the ITS (CMTS or INA) head-end controller are encoded over the physical RF and fiber analog linear media by transmitting in both directions, over the HFC media, modulated analog passband fixed shape waveforms, called symbols, also as explained above. The fiber nodes are merely transparent linear points of conversion between the analog RF formats on the home side and the analog optical power formats on the head-end side. The digital detection (conversion of symbol waveforms into digital bits) of the upstream transmission occurs in the burst receivers at the head-end or hubs. Furthermore, the upstream digital communications multiple access (point to/from multipoint) is conducted between the ITS located at the HE or hubs and the HTs. Multiple upstream frequencies (FDMA) are used in the upstream, and on each upstream frequency a slotted- TDMA reservations based limited contention protocol allows multiple home terminals to transmit data bursts in coordination.

In accordance with the invention, the functionality of the ITS head-end controller is distributed between the head-end and the fiber nodes, moving the upstream detection from the head-end to the fiber nodes, i.e. placing the upstream burst receivers in the fiber nodes, transmitting the detected digital information in digital form from the fiber nodes to the head-end, and further introducing a novel distributed method to enable this by providing synchronization and calibration control between the two parts of the distributed ITS, which are now remote with respect to each other, namely the head-end MAC layer and the burst receivers in the fiber node.

One aspect in accordance with the invention transforms the analog return path from the fiber node to the head-end into a digital return path, by moving the digital burst receivers from their conventional location in the ITS head-end controller to the fiber node. With the digital burst receivers in the optical nodes, and the digital detection there, a digital link running over fiber optics is provided between the output of the burst receivers in the node and the ITS head-end controllers. This differs from conventional HFC systems which transmit analog passband waveforms encoding QPSK or 16-QAM symbols over the RF and fiber media, all the way from the home terminals to the head-end, and in which analog symbols are detected to digital form only at the head-end or hub.

First, in accordance with this invention the digital signals can be transmitted over part or the entire return path over the fiber media in passband modulation format such as ASK rather than baseband form as disclosed by Dail (referred to above). This is done in order to provide the additional advantage of compatibility with "legacy" systems which already use the upstream transmission band with proprietary modulation formats.

The reason to use passband ASK or equivalent passband modulation in the upstream is to meet a key objective of the proposed invention, namely the provision of a solution for backward compatibility with "legacy" networks (not of the DOCSIS or DVB type) wherein the lowband (e.g. 5 to 42 MHZ in the US) is already occupied in part by upstream transmissions from home terminals which do not confirm to the main standards DOCSIS or DVB that apply to the invention.

In contrast, Dail discloses baseband upstream transmission after the digital detection of the return path transmissions from the home terminals, which would preclude the linear transmission of the legacy spectrum back to the head-end and provide no solution for back compatibility.

In accordance with the invention, the ITS is synchronized with the remoted burst receivers into the node and with the home terminals, in a way which is compatible with the centralized RBLC-HFC based standards.

In these standards it is the role of the ITS at the head-end to provide a common time-base to all home terminals such that the system insures arrival of packets from each home terminal at the head-end, aligned on a time axis grid of regular time-slots. Distributing the functionality of the ITS between the head-end and the fiber node could conceptually be viewed as "elongating the wire" from the burst receiver to the MAC layer of the CMTS/INA over as long a span as tens of Km (while possibly passing through layers of TDM multiplexing and demultiplexing on the way).

There is a technical problem, though, with this elongation of the link between the burst receivers and the MAC: the resulting spans are now indeterminate in length and could be possibly slowing varying due to temperature changes, or due to queuing delays in the TDM process. Unknown or varying propagation delays will violate a key requirement of the DOCSIS and DVB-RC standards to have fixed and known delays, and the ranging and synchronization protocols defined in the standards will fail, as these protocols are based on using synchronous reservations, whereby the transmissions from each home terminal are so timed as to fall within precise time-slots.

In accordance with this invention, further there is a distributed calibration and synchronization method and apparatus, without which a system as proposed by Dail would not function at all in HFC networks using multiple access standards or standards such as DOCSIS or DVB.

This failure is due to violation of the precise timing relationships between the times of transmission and reception, in the wake of the indeterminate delays.

The present system allows location of the RF to digital detection function in the nodes while maintaining full compatibility with existing (DOCSIS, DVB-RC) and possibly new RBLC-HFC standards. This is done by providing synchronization and calibration in the fiber node and applying minimum changes to the structure of existing head-end ITS systems, which changes may be still interpreted as conforming with the standards.

The result is that this system can function with standard DOCSIS cable modems or standard DVB set-top boxes or to be introduced home terminals of future RBLC-HFC standards, such as OpenCable.

The present system works with standard home terminals and keeps the multiple access protocols functional by providing distributed calibration and synchronization. Lack of such a solution in the prior art incapacitates the ability to have a functional system at all with DOCSIS and DVB home terminals.

The present distributed calibration and synchronization involves the remoted digital burst receivers and the head-end MAC. This is implemented by incorporating in the optical node, along with the burst receivers, an additional stripped-down home terminal, making use of its downstream cable demodulator plus MAC layer as further indicated below.

In one embodiment this is done by introducing into the node either a cable modem assembly, in the case of a network home cable modems, or a set-top assembly, in the case of a network with home set-tops, and modifying the software run by the cable modem or set-top introduced at the node.

DETAILED DESCRIPTION

Figure 6:
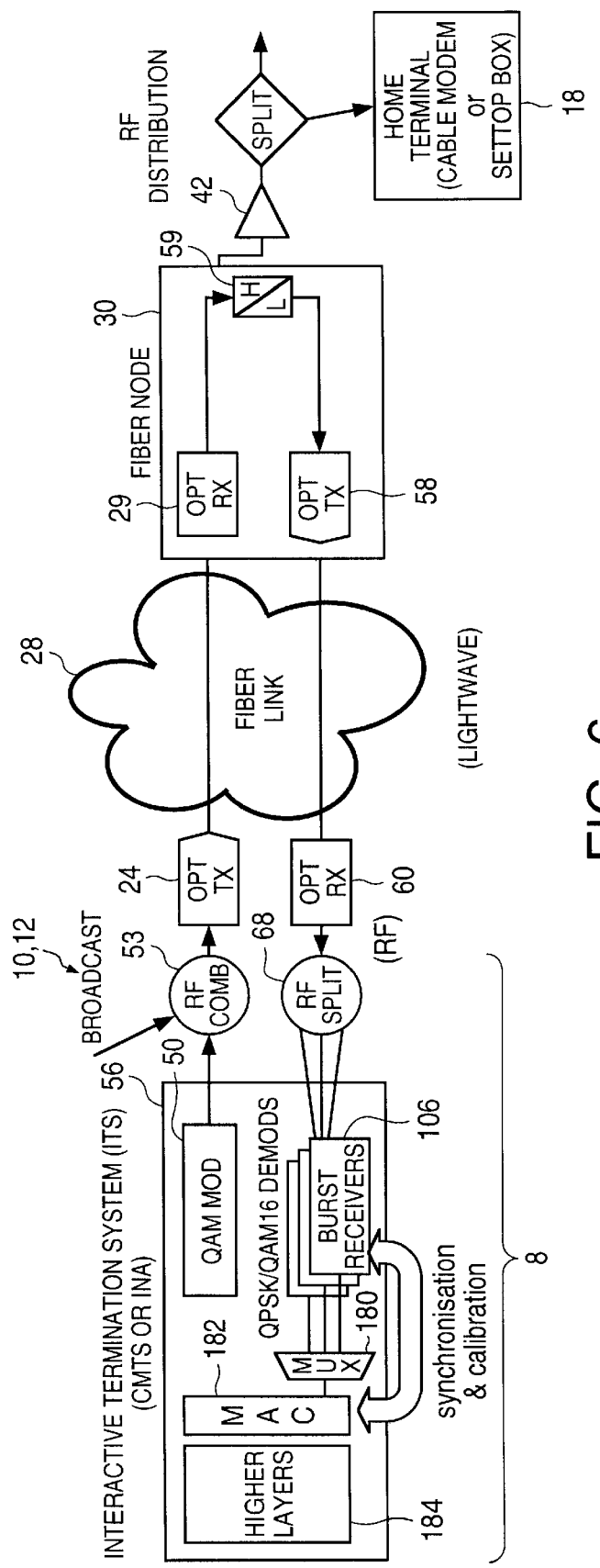
FIG. 6 shows a prior art system with burst receivers in the ITS.

FIG. 6 shows a prior art system with a lumped ITS 56 with the burst receivers 106 conventionally included in the ITS 56. The calibration and synchronization (C&S) function between the MAC 182 and the burst receivers 106 is indicated by the double headed arrow indicating the exchange of information between the burst receivers and the MAC in the HE 8. FIG. 6 shows structures as in the previous figures, and also additional detail in the ITS 56 including multiplexer 180 coupled to MAC 182 and the higher layers 184.

Figure 7:
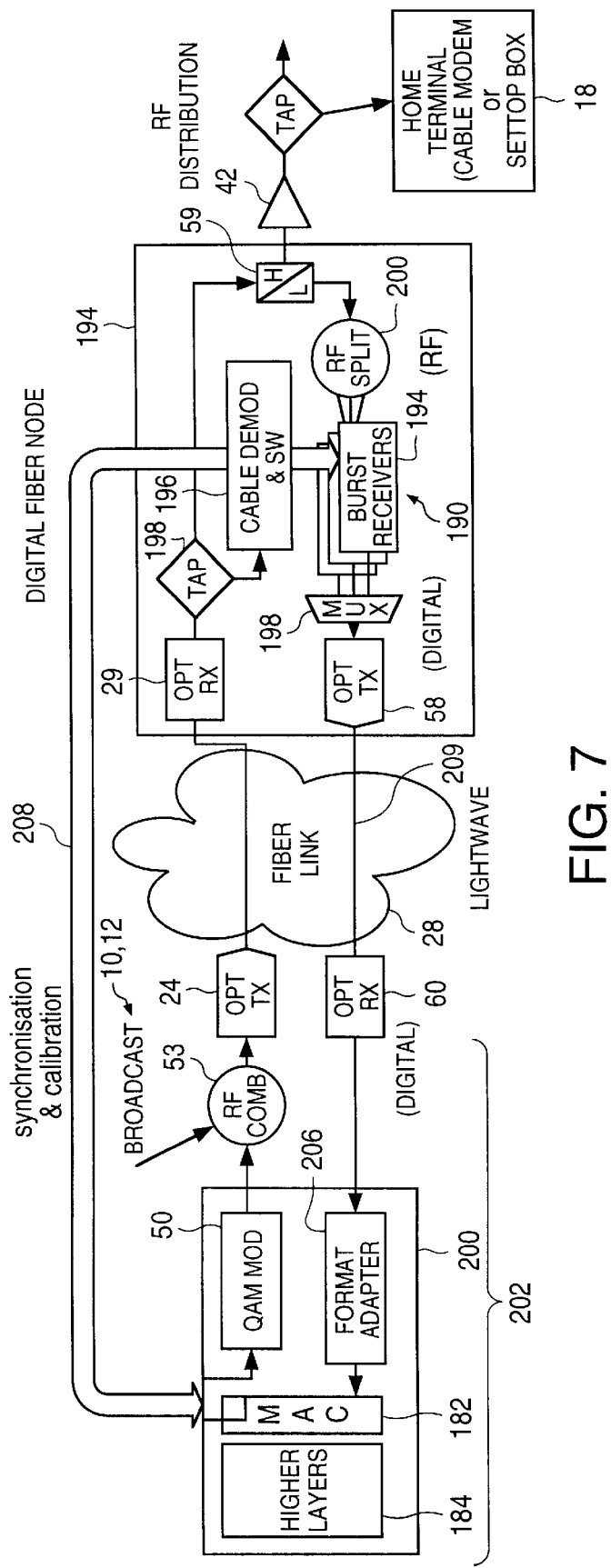
FIG. 7 shows a system in accordance with the invention.

In accordance with this invention, elements of the network at the fiber node are combined together into an entity called here 'Interactive Agent' ("AG") which may be implemented as a single board electronic circuit. FIG. 7 shows such a network in accordance with the invention, having many elements similar to those of FIG. 6 and similarly labeled. The AG 190 here is part of fiber node 194. The AG includes the burst receivers 194, the auxiliary stripped down home terminal, including a downstream cable demodulator 196, the microcontroller (not shown) associated with a conventional home terminal, modified MAC software ("SW") running on the microcontroller, and a TDM multiplexer (or statistical multiplexer) 198 associated with the burst receivers. The connectivity between these elements is shown in FIG. 7 including the tap 198 and RF splitter 200. Detailed structure and timing analysis of the AG 190 is described below in conjunction with FIGS. 10, 11.

As an example consider an HFC architecture where 2000 homes passed are served per fiber node. Given the large number of subscribers whose noise sources combine in reverse, this may suffer from noise accumulation limitations, while the upstream bandwidth provided per subscriber may not be sufficient. It is then beneficial to segment the 2000 homes passed into, e.g., four RF sections each collecting returns from 500 homes passed in the 5–40 MHz band. There are several alternatives for transporting these four low-band spectra from the single node back to the head-end. In the present system the digitization of the return path is an alternative to the analog return methods discussed in the background above.

A certain upstream narrowcast domain is in the prior art partitioned into two or four domains. This is done in the prior art by connecting each upstream RF port of the four ports to an input port of a frequency stacker in the FDM case, or to a separate DWDM return laser in the WDM case, or to an analog to digital converter in the PCM case.

The present solution instead uses four sets of digital burst receivers to demodulate the returns from each of the four RF segments. Each set of burst receivers resides in one AG and receives transmissions of the upstream RF channels from a single RF leg. The digital outputs from the burst receivers are TDM or preferably packet multiplexed within the AG.

The number of burst receivers in each AG (each burst receiver is associated with one upstream channel) depends on the total upstream bandwidth specified in each narrowcast domain. Each RF input represents a point of collection of upstream returns from one narrowcast domain. At a minimum, there is just one upstream channel per narrowcast domain, so there is a single burst receiver on each agent and the multiplexing stage may be eliminated. The four digital outputs from each of the four Interactive Agent modules are combined into a single digital stream by a second stage TDM or packet multiplexer in the fiber node (see FIGS. 10 and 11).

If a single AG is used (e.g. for low penetration the four RF inputs may be combined merging the four narrowcast domains of 500 subscribers into one large 2000 subscribers domain) the second stage TDM or packet multiplexer may be eliminated.

The calibration and synchronization downstream demodulator 196 in each AG 190 is identical (in its physical layer) to the types of demodulators employed in the HTs. It is associated with the burst receivers 194 which listen to the return transmissions of the same HTs covered by the corresponding head-end modulator.

The MAC domain consists of the set of all users served by one or more downstream channels and one or more upstream channels, bound together by the two-way MAC protocol. Thus, the HTs belonging to one MAC domain have their return transmissions managed by the same MAC layer entity which controls the downstream channels that cover the same HTs.

The schedule and other MAC timing and management messages are sent over one of the downstream channels (designated the "provisioning channel" in the DVB standard). Typically the MAC domains are defined with a single downstream channel which also carries the provisioning function. In this case the downstream narrowcast domain associated with the particular QAM modulator is the union of the upstream narrowcast domains associated with each of the bursts receivers. Each MAC domain must be associated with one C&S demodulator tuned to the downstream provisioning channel.

In effect the C&S downstream demodulator in the head-end acts like another user within the MAC domain, listening to the downstream MAC management messages intended for all the users in the particular MAC domain. The demodulator intercepts those MAC management messages and extracts from them scheduling information necessary to synchronize the burst receivers (which are located in the node) of the MAC domain with the head-end MAC.

This demodulator unit differs from the those in the regular HTs in the field in that its own MAC layer is modified to disable the upstream transmissions, but a specialized hardware/software interface is introduced instead to implement the distributed ITS algorithm as further described below.

Head-end Interactive Termination System

Figure 8:
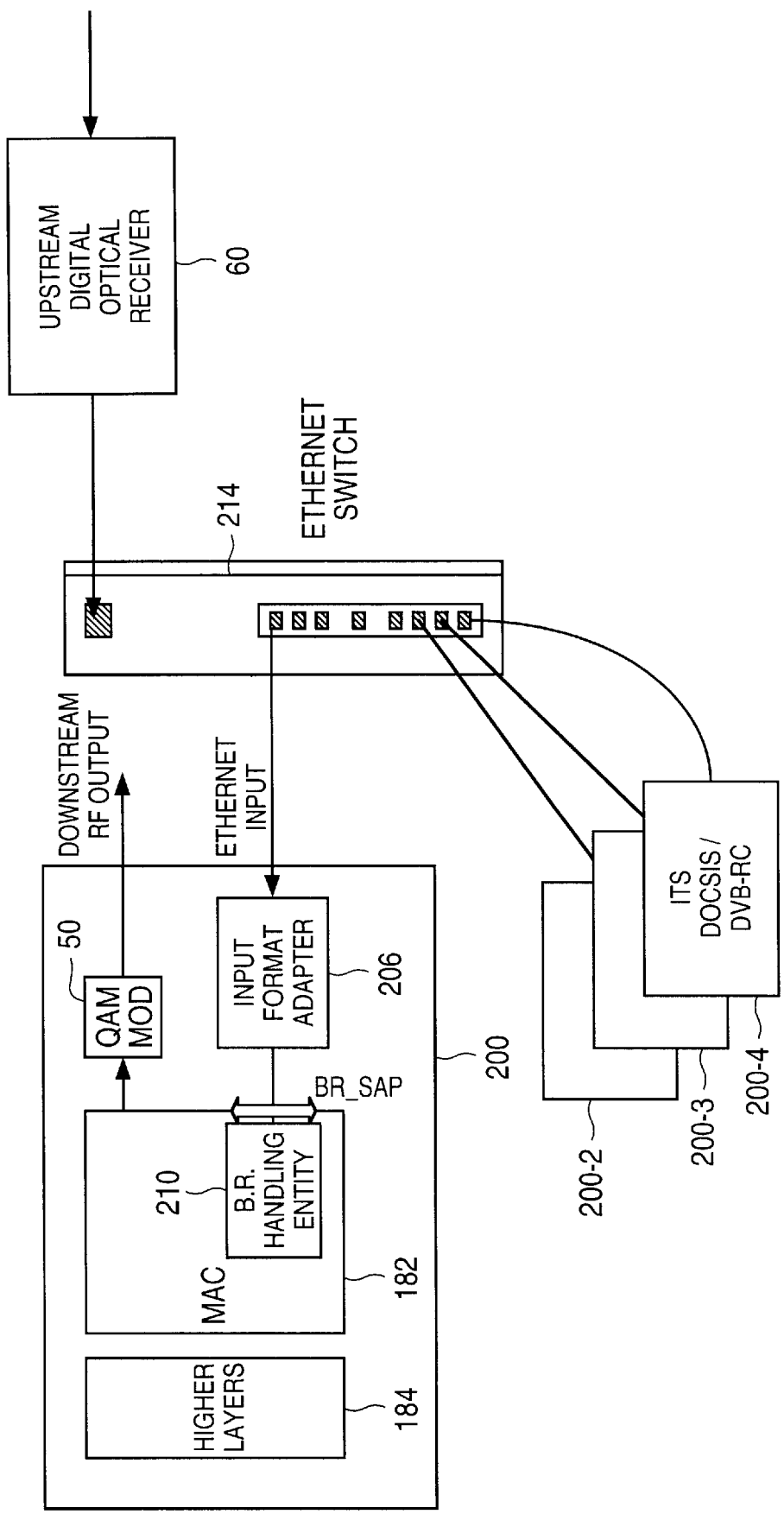
FIG. 8 shows an ITS in accordance with the invention.

FIG. 8 shows an otherwise conventional ITS 200 modified in accordance with the invention. Having had the burst receivers removed, the ITS 200 (in the HE 22) no longer accepts an RF input signal but rather processes a direct digital input signal. An appropriate digital input format adapter 206 allows input of the digital return signals directly into the MAC 182. After passing through adapter 206, the signals provided to the MAC 182 must appear identical to those on the conventional interface used in the conventional HE ITS 56 to link the burst receivers with the MAC layer.

On the HFC network side of the ITS, the digital format adapter 206 is, e.g., implemented using a standard digital interface such as Ethernet. An Ethernet (layer 2) switch 214 may be coupled between the output of the digital return path at the HE and the Ethernet input to the adapter 206. The changes required in the software of the HE ITS are further described below. FIG. 8 also shows the burst receiver (B.R.) handling entity 210 in the MAC 182 and Ethernet switch 214 coupled to a plurality of other ITS devices 200-2, 200-3, etc.

Although the HE ITS 200 deviates from those of conventional systems, the combination of HE ITS 200 and the fiber node 194 with the AG appears to be a standard conforming ITS.

Multiplexing In the Return Path

Detaching the physical layer (which converts the upstream RF to digital) away from the ITS in the head-end and locating it in the fiber nodes amounts to having a distributed ITS with the link between the burst receivers and the MAC layer of the ITS substantially elongated. FIG. 7 shows a point to point link 209 connecting the physical layer burst receivers 190 with the communication layers of the MAC 182. However, this link 209 may be itself implemented in terms of a stack of several digital and optical layers. There are several possibilities, e.g., WDM multiplexing, TDM multiplexing, or a combination of both WDM and TDM multiplexing (see FIG. 9).

Thus, following the flow of upstream RF signals from the home, once these signals propagate via the coaxial cable portion of the system and reach the fiber node, they are converted from RF to digital formats using QPSK/QAM16 burst receiver demodulators in the fiber node. The digital signals at the outputs of these burst receivers are TDM or packet-multiplexed and are then either applied to a laser source, using direct baseband on-off modulation, or are applied to a bandpass modulator such as an ASK or FSK or similar modulator for passband on-off modulation. This latter scheme which frees the baseband for transmission of the legacy low-band (5 to 42 MHz) is further described below. The motivation to apply such passband modulation is to conserve fibers by FDM multiplexing the analog upstream return and the digital upstream transmission on a single fiber. If conserving fiber is not an objective, then SDM (Space Division Multiplexing) could be used, i.e. two separate fibers provided each carrying the respective analog upstream return and the digital upstream transmissions.

The upstream optical digital return path signals (either baseband or passband ASK or another passband modulation format) then depart from the fiber nodes 194 in digital form on the upstream fibers, propagating all the way back to the head-end 202, possibly via intermediate levels of WDM and/or TDM multiplexing. The figure depicts the combined WDM and TDM case, but elements of it could be used for the cases of WDM alone and TDM alone.

Figure 9:
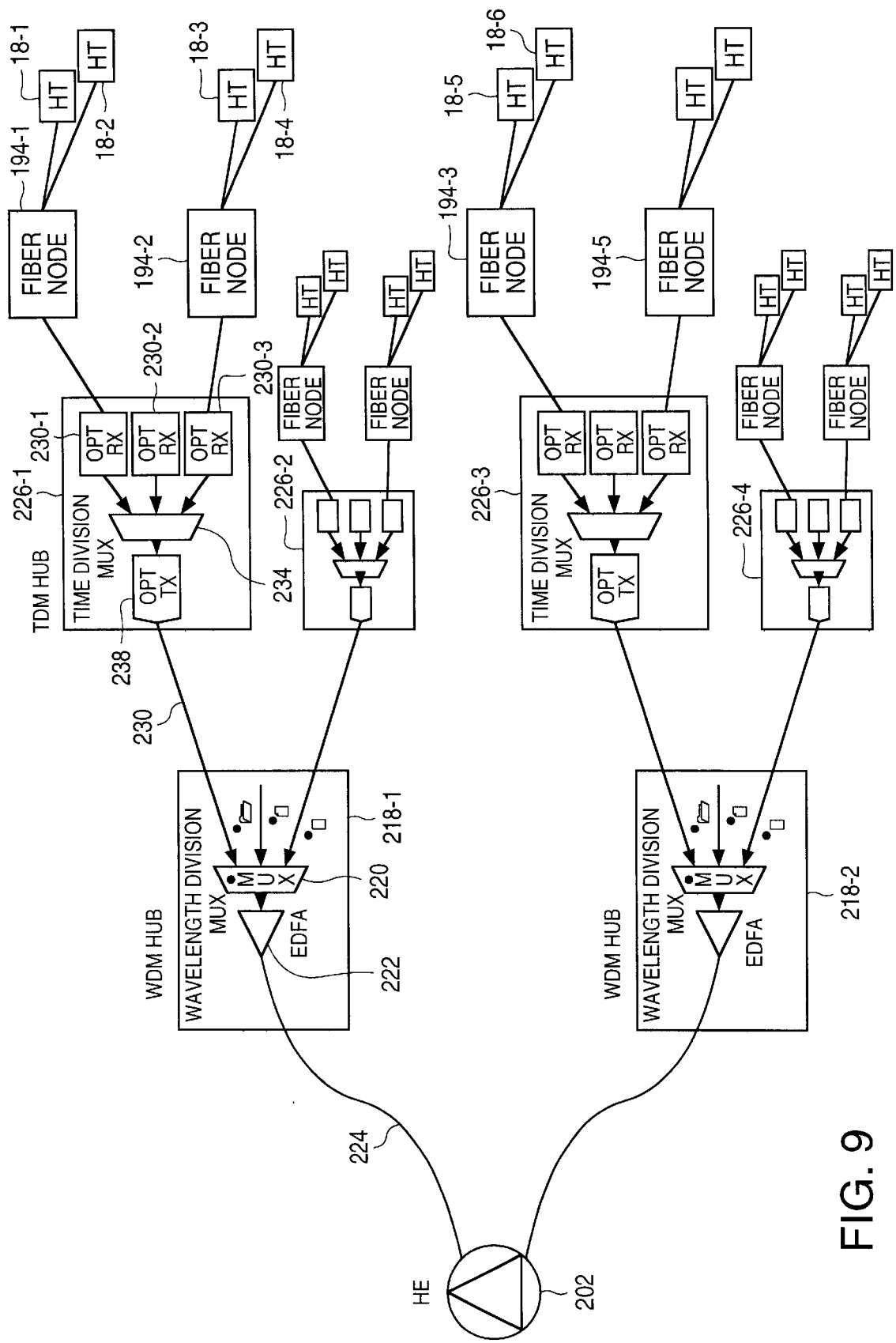
FIG. 9 shows a hybrid TDM-WDM network return path.

In the WDM case (where the TDM Hubs in FIG. 9 are eliminated) several such optical digital signals from several nodes are placed on different wavelengths, and concentrated onto a single fiber at a secondary hub 218-1 called here WDMH (Wavelength Division Multiplexing Hub) containing a Wavelength Division Multiplexer (WDM) 220 and an erbium doped fiber amplifier 222, with the single fiber 224 being sent up to the HE 202 to transport the aggregate of wavelengths, each carrying the digital transmission from one node.

In addition or in lieu of that, an intermediate TDM multiplexing layer may be implemented at a Time Division Multiplexing Hub (TDMH) 226-1, 226-2, etc., coupled at an intermediate location between the nodes 194 and the head-end 202 (or the WDMH 218). The TDMH 226-1 concentrates the upstream digital traffic arriving over digital fibers from multiple nodes into a single digital stream aggregating the individual digital upstream transmissions from the nodes. The TDM (or statistical packet) multiplexed signal is then directed over an output optical fiber 230, this time in baseband to the head-end, either directly or possibly via an intermediate WDMH 228-1 in which case the output fiber 230 carries an optical signal at a particular wavelength, distinct from those of other TDMHs. Each TDMH 226 includes several optical receivers 230-1, 230-2, 230-3, a TD multiplexer 234 and an optical transmitter 238.

Any operations of TDM and/or WDM multiplexing are undone at the HE by corresponding WDM and TDM demultiplexers.

The TDM multiplexer 234 in the TDMH 226-1 as well as the TDM multiplexer in the fiber nodes 194, combining the digital outputs of multiple burst receivers, are implemented on either a bit or digital word basis or as a statistical packet multiplexer interspersing packets from the various nodes based on random arrivals at a set of input buffers, according to a scheduling discipline. One implementation of the TDM multiplexer includes an Ethernet switch which receives multiple Ethernet packets on several ports and directs them to an output port. The advantage of using Ethernet is that a layer 2 Ethernet switch at the head-end to perform the demultiplexing and route the various packets to their corresponding ITS units is well established and of low cost, and furthermore, implementation of a digital format adapter at the HE ITS based on Ethernet input is straightforward.

The introduction of TDM multiplexing in addition to WDM multiplexing in the upstream path as in FIG. 9 lifts a major limitation, namely the insufficient number of wavelengths being available to perform a substantial degree WDM multiplexing in the return path, once a large number of fiber nodes is used.

This two-stage multiplexing, first TDM then WDM, performed on the streams fanning in from multiple nodes towards the head-end, provides a larger total fan-in ratio as required for the upstream transport of digital streams from smaller narrowcast domains. This allows the fiber nodes to penetrate much deeper and serve smaller size narrowcast domains, which results in higher bandwidth per subscriber.

The present network results in high performance return path systems with deep penetration, and a small number of subscribers in each narrowcast domain, with high bandwidth being switched on demand to each subscriber, and low ingress noise accumulated from the small number of subscribers in each narrowcast domain, which prevents impairments of the upstream transmission.

TDM Demultiplexing at the HE

TDM multiplexing is carried in the present network at the AG level, at the fiber node level (combining the agent outputs) and at the TDMH level. One implementation is based on Ethernet switches implementing statistical multiplexing of Ethernet frames which in turn carry in their payload IP frames.

The corresponding TDM demultiplexing at the HE can be conveniently implemented by an Ethernet switch which precedes multiple ITS units of the DOCSIS kind or the DVB kind or a combination thereof (see FIG. 8). Such a switch implements the Ethernet protocol at layer 2 and is therefore compatible with the layer 2 Ethernet multiplexing mentioned above.

Following a particular digital packet from a particular burst receiver, this packet the format of which follows either the DOCSIS or the DVB-RC standard (which can itself be of Ethernet format in the DOCSIS standard), is encapsulated within the payload of an outer Ethernet (or IEEE 802.3) frame in the agent, then multiplexed together with other such packets from other burst receivers on the agent in the TDM Ethernet multiplexer (e.g. FIG. 7). The destination address of this packet is the burst receiver service access point (BR-SAP in FIG. 8) of the MAC layer in the head-end, namely the interface where the input from a local burst receiver is expected in a conventional ITS. The particular packet will pass the additional levels of Ethernet multiplexing at the fiber node, and then possibly at the TDMH if provided (e.g. Gigabit Ethernet could be used there), and will be routed by the Ethernet switch at the HE to the appropriate output port corresponding to the ITS where the MAC layer in charge of the particular burst receiver resides.

In accordance with this invention, all the IP (Internet Protocol) routing in the head-end is unchanged, while there is a minor modification of the conventional HE CMTS and INA on the HFC network side (inserting the above mentioned MAC format adapter digital interface instead of the removed burst receivers), while keeping intact all back end (core network side) of the ITS, and minimally changing the overall head-end operation of the ITS and the associated routers and servers.

Furthermore, by distributing the ITS between the head-end and the fiber node, with the physical layer (burst receivers) of the ITS and associated synchronization means placed in the node but the rest of the system left in the HE, the present system remains fully compatible with existing DOCSIS or DVB-RC home terminals, and with any future centralized standards that may eventually evolve, once the distributed head-end to home terminals protocol is modified along the lines of this invention.

A significant advantage of the present approach with respect to the FDM and WDM schemes is elimination of the analog return path.

It is apparent that in the context of reducing the size of the narrowcast domains, which all methods achieve, the advantages of reduction in noise accumulation from the subscribers are equally enjoyed by our invention and the FDM, DWDM methods.

However, placing digital burst receivers on each RF input, and then TDM multiplexing the burst receiver outputs, seems to be less expensive than the analog FDM frequency-stacking and DWDM analog solutions, as four AGs(minus the cost of the burst receivers) plus the TDM stages plus a DWDM laser may be lower cost than the frequency stacker plus a DWDM laser or than four DWDM lasers.

Additional advantages of the present network are:

The limitations of analog DWDM/FDM transmission such as those related to laser chirp and to phase noise of the frequency stacking are eliminated.

In particular, the limitation of analog return optical transmitter clipping is eliminated. There is no longer a need to obey a hard upper limit on the total power presented to an analog return path laser. This has the effect of simplifying the operational procedures of coordinating the individual powers of the upstream transmitters in each home terminal, making the maintenance of networks with large numbers of modems more affordable.

The digital return path has a longer optical range and is thus more cost effective and more reliable as return path optical amplifiers can be eliminated on the way to the head-end.

The transponders which are present in HFC fiber nodes for telemetry purposes, i.e. status monitoring and control, are simplified. There is no longer a need for the telemetry transponder in the node to contain its own separate modem, instead the telemetry signals to/from the node can be carried over the two-way digital communication subsystem (the upstream telemetry is injected in the multiplexer of the digital burst receivers, whereas the downstream telemetry rides on the digital downstream signals provided for C&S as further described below). The cost reduction in the node transponders by elimination of the associated modems offsets the cost of adding the digital synchronization and calibration means.

By bringing digital transmission forward into the optical system there is a greater flexibility in configuring multiple nodes under the new digital architecture. In particular TDM multiplexing is enabled, allowing its combination with WDM multiplexing to provide much smaller multiplexing domains and much higher bandwidth per subscriber.

The perception is that the modified HFC networks are more reliable and more acceptable to phone companies or cable companies' technical staff with telco bias. The network now resembles a telco (telephone company) architecture with the optical fiber node being the equivalent of the DLC (Digital Loop Carrier) in telephony, the forward point in the network where digital conversion is performed on the analog transmission signals originating at the HT.

Support of Multiple Standards and Legacy Support

A complication is that multiple digital HFC standards cannot be supported by a single type of burst receiver and associated calibration and synchronization circuitry. Each standard must be implemented with a slightly different type of the AG. Fortunately, there are only current two standards in much use, DOCSIS for cable modems and DAVIC/DVB-RC for set-tops (it is unclear now what the so called OpenCable standard will evolve to).

Furthermore, integrated circuit vendors are currently designing dual-purpose chips to address both standards at once, so the two AG configurations may differ only in the demodulator HW and its control software or firmware.

The AGs associated with each of the two standards will run two different software versions for the distributed synchronization and calibration functions, and will have different demodulators.

This means that fiber nodes where both types of standards are covered carry both types of AGs. Since average data rate per home terminal is higher for DOCSIS than for DVB (as DVB settops typically transmit in short and infrequent bursts, mainly for pay per view interactivity), there will be more DOCSIS burst receivers and typically more DOCSIS interactive agents than DVB burst receivers and interactive agents. In one "scaleable" implementation described further there are four DOCSIS interactive agents vs. a single DVB interactive agent.

Another possibility is to place the DOCSIS and DVB interactive AGs at different depths in the network. For example, in one "deep fiber" implementation described further below, small fiber nodes with one DOCSIS agent each, called herein DFNs (Deep Fiber Nodes) are placed to cover a narrowcast domain of about 100 subscribers, whereas the DVB interactive agents are placed closer to the head-end, being collocated with the TDM multiplexer (TDMH) and covering a larger narrowcast domain of 2000 subscribers, which may utilize the upstream signaling for VOD ("video on demand") service subscription and control.

The "legacy" digital transmissions in the lower band are handled in two ways:

1. Spectrally segregating the legacy transmissions from the standard transmissions, i.e. bandpass filtering the "legacy sub-band", and providing an analog return laser over which to upstream transmit the legacy portion of the spectrum. This requires one fiber or wavelength (in a DWDM system) per node in the system for the legacy transmission.

2. Sub-carrier multiplexing the RF "legacy sub-band" together with the upstream digital transmission. One could upconvert the 5 to 42 MHz lowband above the baseband digital traffic or rather one could upconvert digital traffic and sub-carrier multiplex it at frequencies above the 5 to 42 MHz lowband. This second mentioned possibility is proposed since upconversion/downconversion of the analog lowband is more complex and is impaired by phase noise and frequency offsets, whereas the upconversion and downconversion of a baseband on-off-keyed digital signal is simpler and more robust, and it amounts to simpler ASK RF modulation at the upstream transmitting end, while the particularly simple envelope detection may be used at the receiving end. Another passband modulation schemes such as FSK, DPSK, could be used by ASK is the simplest to implement.

In both schemes it is desirable to provide spectral filtering means of separating the legacy transmissions to be transmitted in analog form back to the head-end from "state-of-the-art" transmissions that are digitally detected right at the node. This is further described below.

Timing Analysis of Distributed Calibration and Synchronization

Figure 1A:
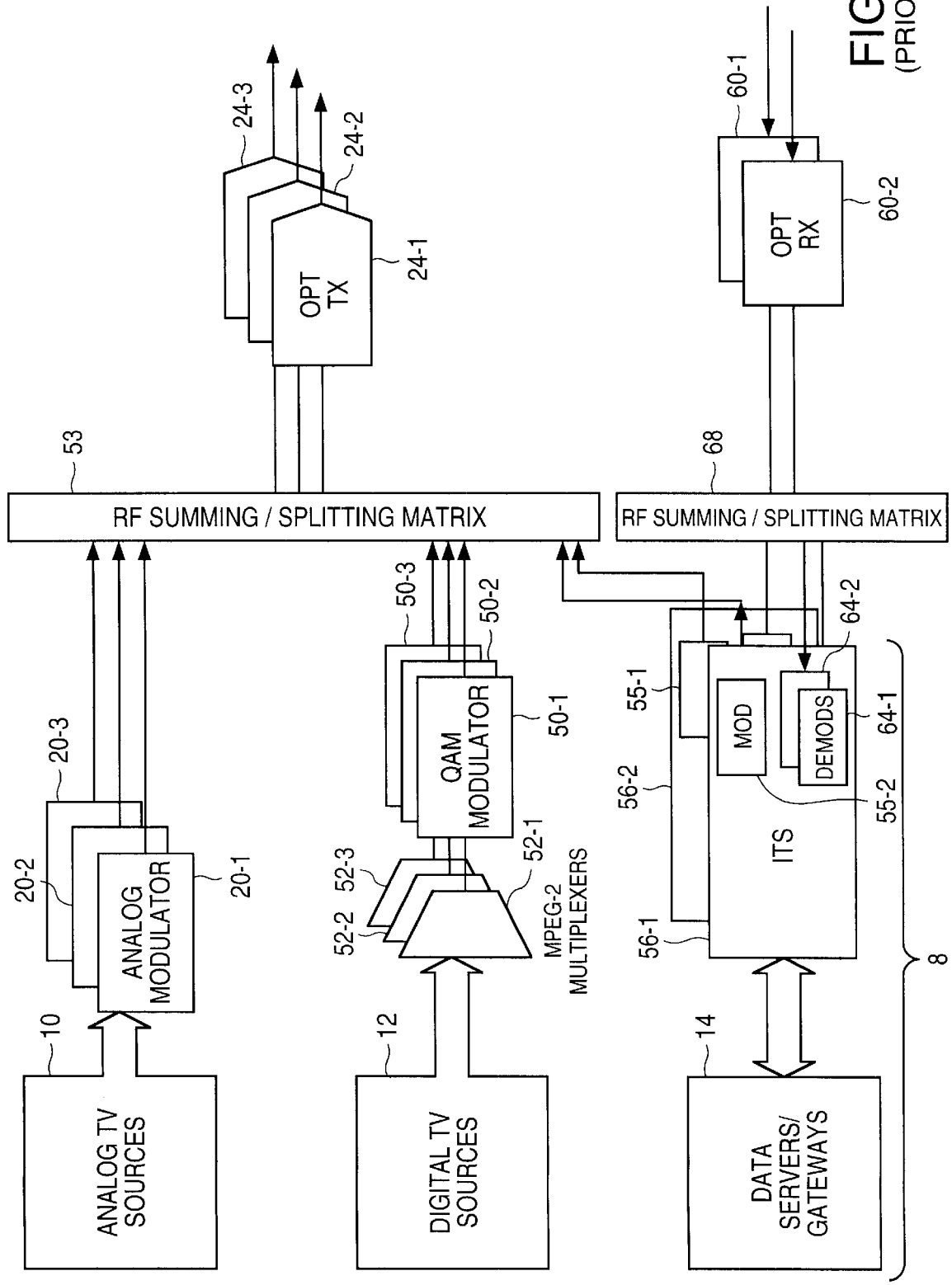
FIG. 1a shows a head end for hybrid fiber coaxial (HFC) cable network.
Figure 1B:
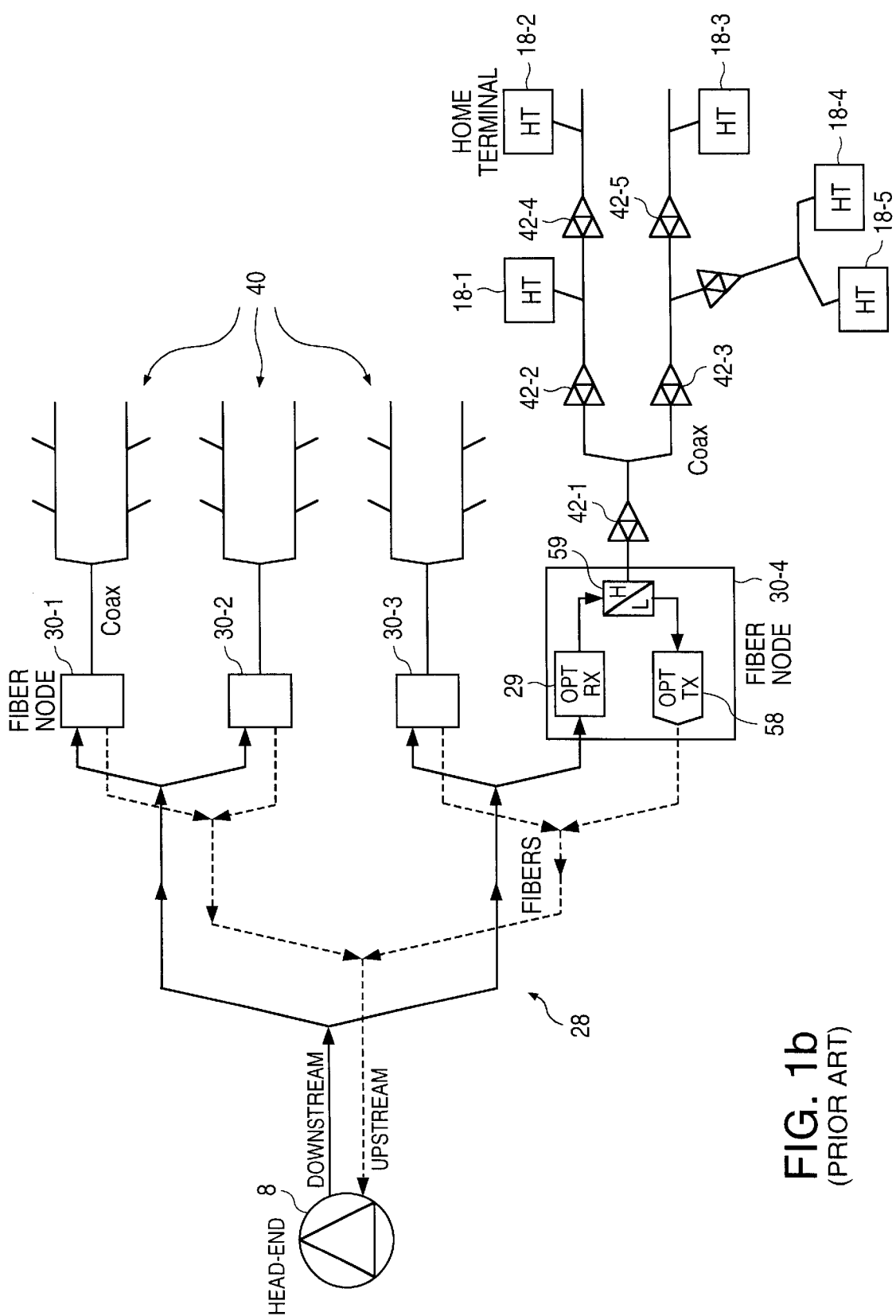
FIG. 1b shows a prior art HFC network.
Figure 2:
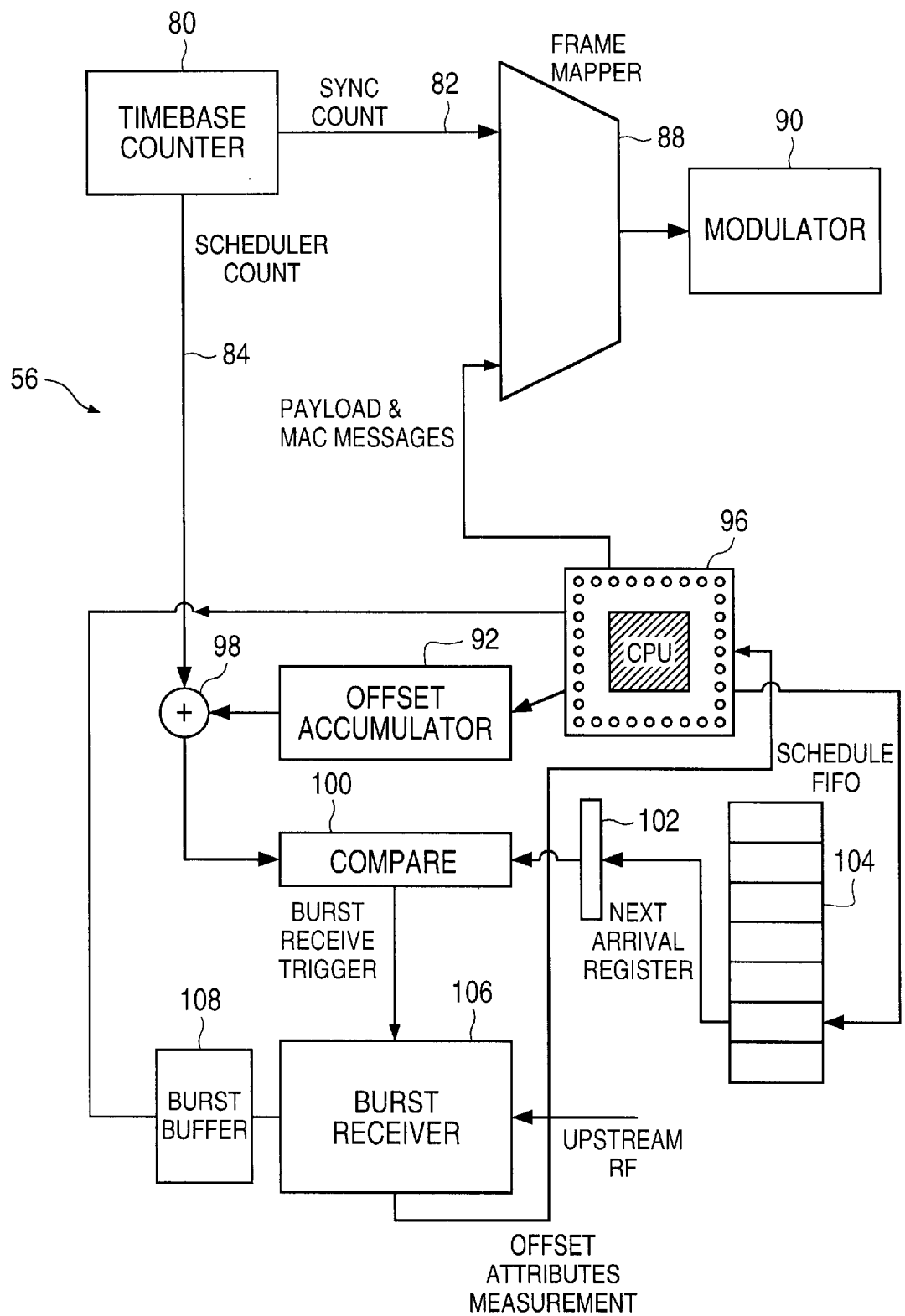
FIG. 2 shows a prior art head end interactive termination system (ITS).
Figure 3:
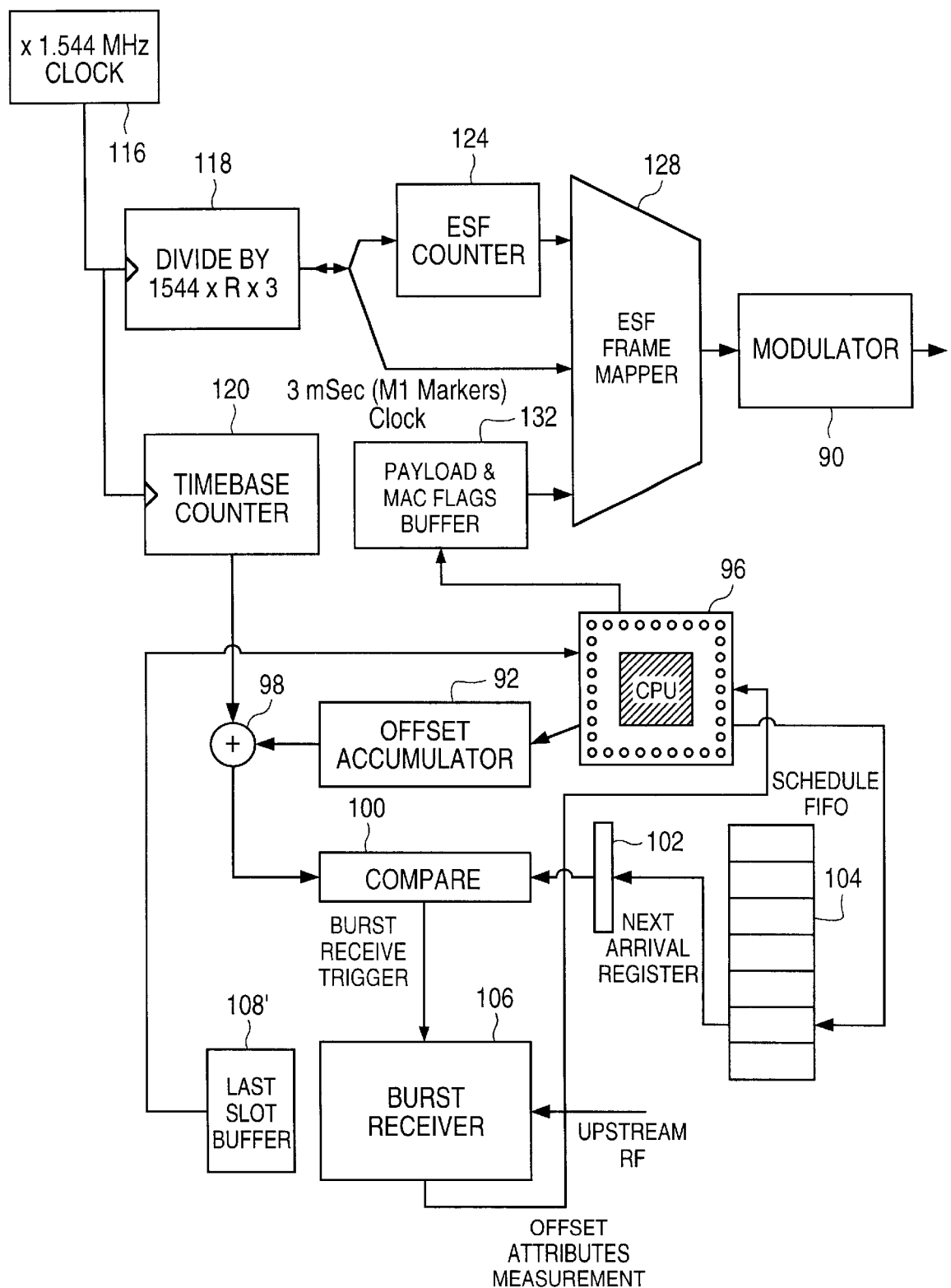
FIG. 3 shows a DVB-RC version of the FIG. 2 apparatus.
Figure 4:
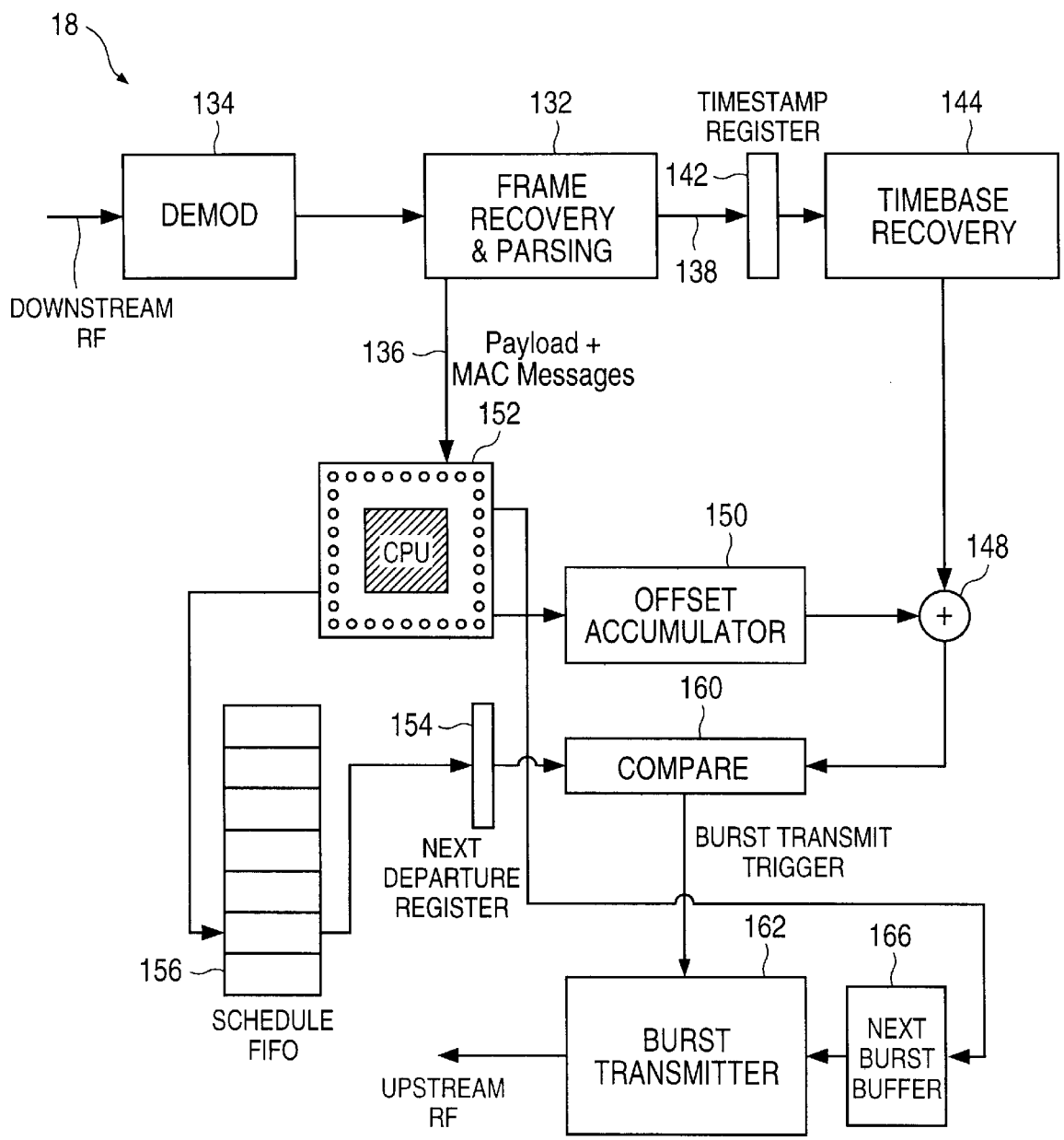
FIG. 4 shows a home terminal.
Figure 5:
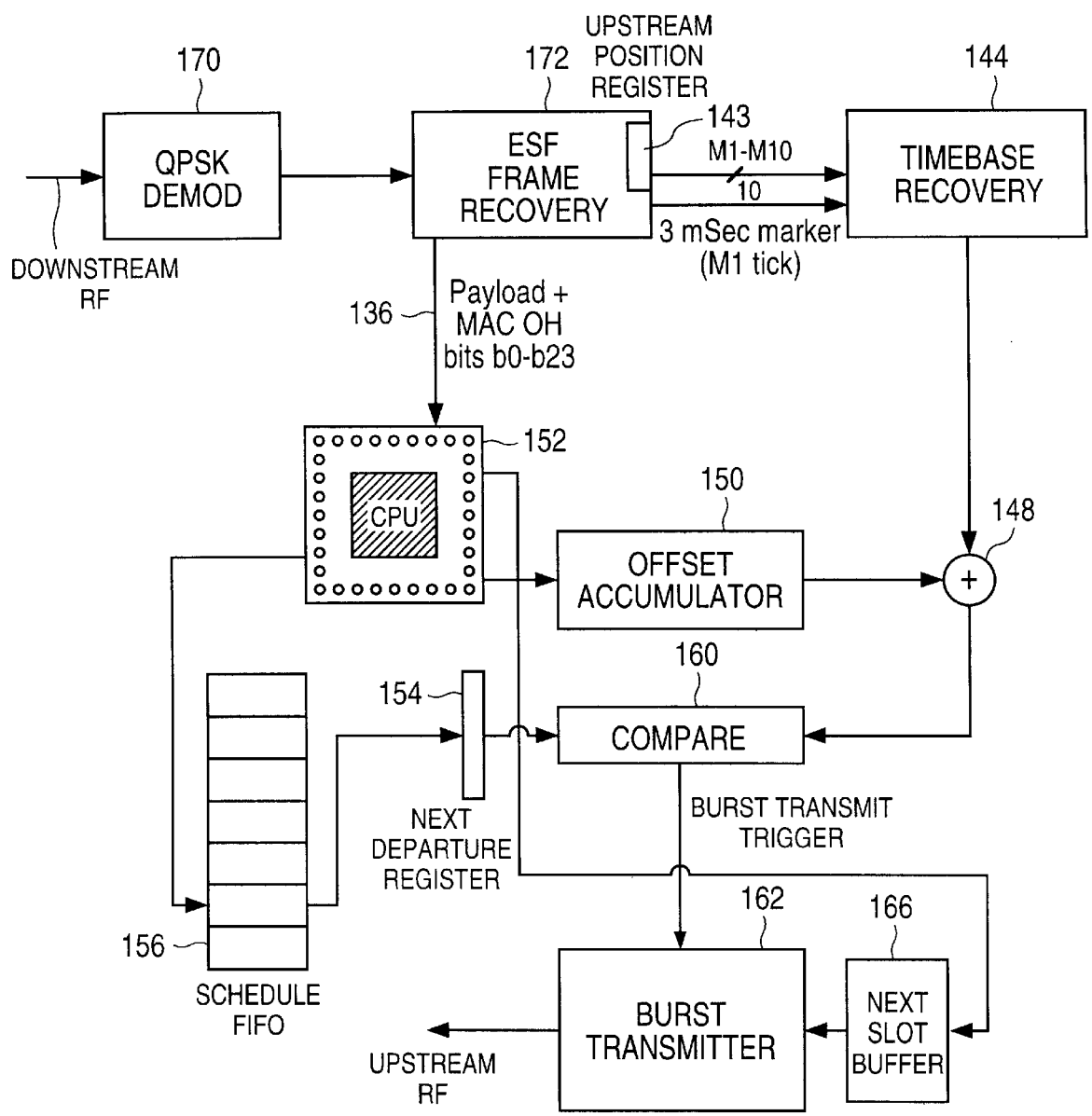
FIG. 5 shows a DVB-RC version of the FIG. 4 apparatus.
Figure 10:
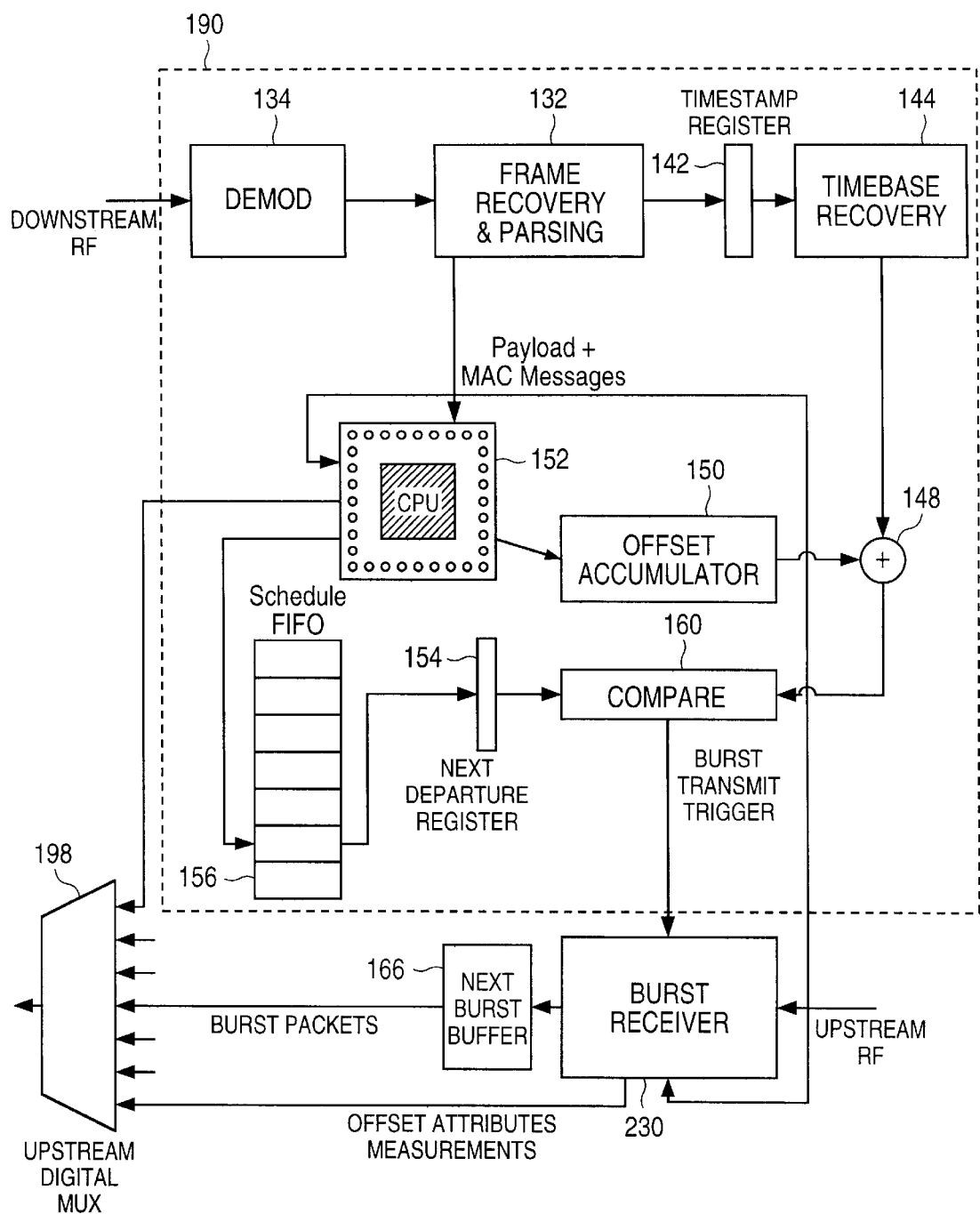
FIG. 10 shows an interactive agent in the fiber node.
Figure 11:
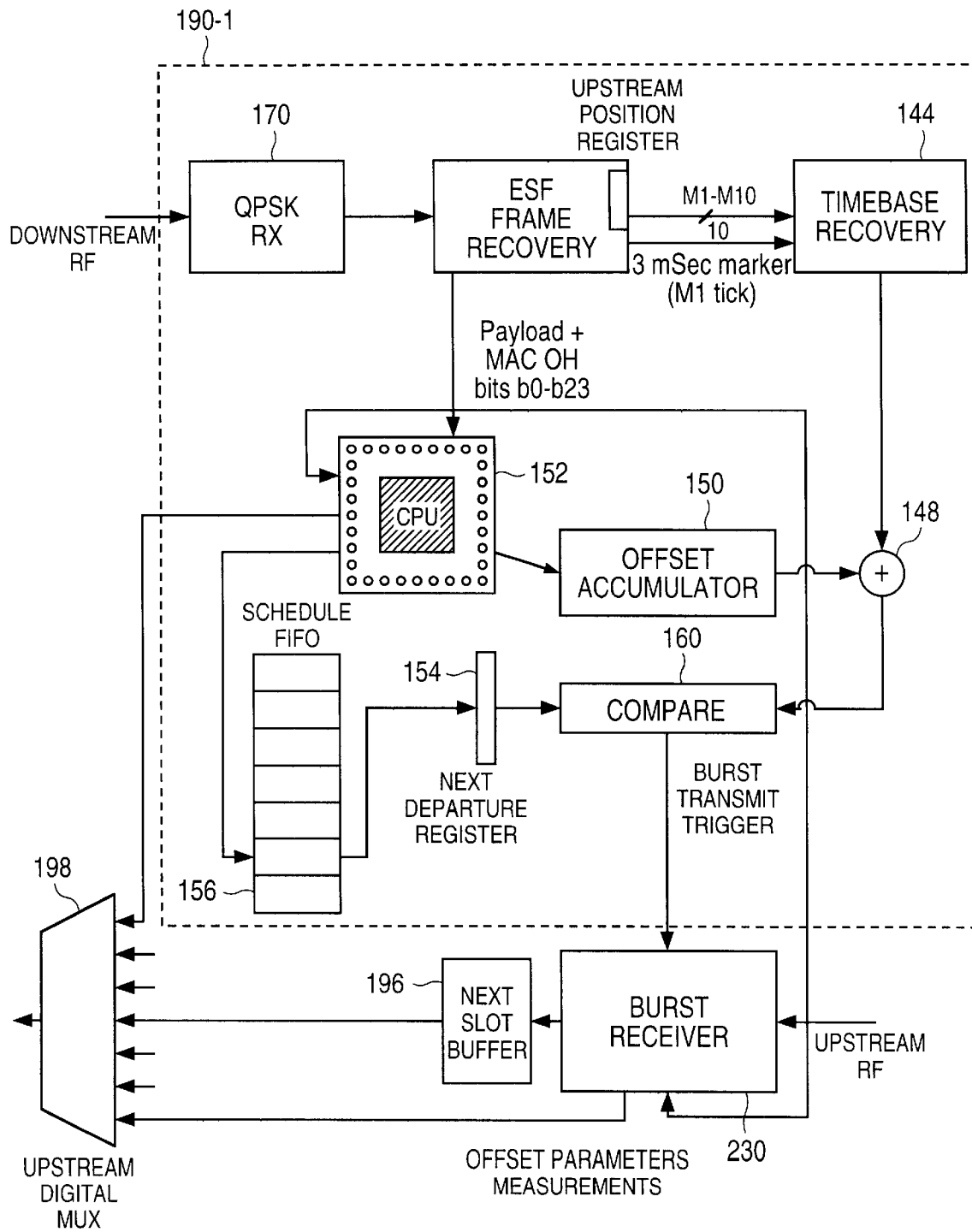
FIG. 11 shows the DVB-RC version of the FIG. 10 apparatus.

Distributed calibration and synchronization is achieved by a protocol which involves the head-end portion of the ITS, the conventional HT (FIGS. 4, 5) as well as the portions of the optical node involving the apparatus (which in turn includes the AG) of FIG. 10 in the generic case corresponding to both the DOCSIS and DVB standards, and of FIG. 11 for the DVB standard. FIGS. 10 and 11 each include a number of elements the same as in the home terminal of FIGS. 4 and 5, except that they have a burst receiver 230, instead of a burst transmitter. In FIG. 10 the AG is 190; in FIG. 11 the AG is 190-1.

To understand the timing synchronization between the HE, the AG at the fiber node and the HTs, consider the path starting with the ITS at the HE then the AG at the fiber node at propagation delay $\tau_1$ away from the HE and finally the HT at propagation delay $\tau_2$ away from the AG. Within the AG the clock sync is received with delay $\tau^R_{AG}$ as measured from the moment of entry into the physical layer demodulator of a overhead packet carrying a sync timestamp labeled $t_s$ until the moment when phase locked loop timebase recovery stage generates the value $t_s$ at its counter output).

This receive delay in the AG is similar to the receive delay $\tau^R_{HT}$ in the HT. Also introduce the HT transmit processing delay $\tau^T_{HT}$ which passes from the moment a transmit trigger pulse is applied in the HT until this trigger pulse appears at the physical layer of the HT.

It is convenient to assume first that all the processing delays above are zero, building a model first under these simplified assumptions which include only propagation delays, finally extending the model to include the processing delays.

Timing Analysis

As the network is turned on (or is reset) the first step is to establish downstream communication from the HE to the AG and to all the HTs. Then all demodulators in the HT as well as in the AG proceed to acquire their respective timebases by locking onto the sync timestamps coming from the HE.

Figure 12A:
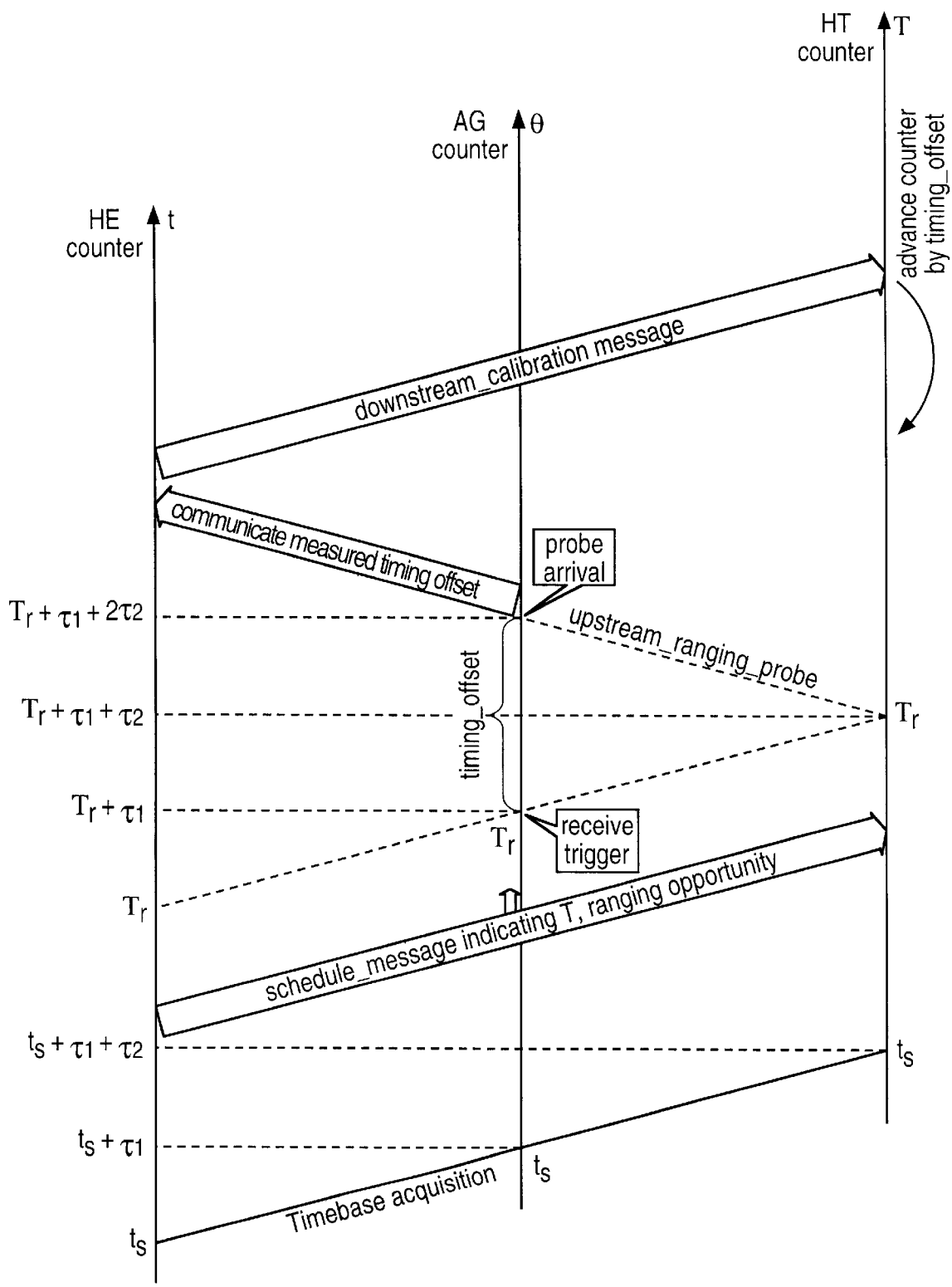
FIGS. 12a, 12b show system timing.
Figure 12B:
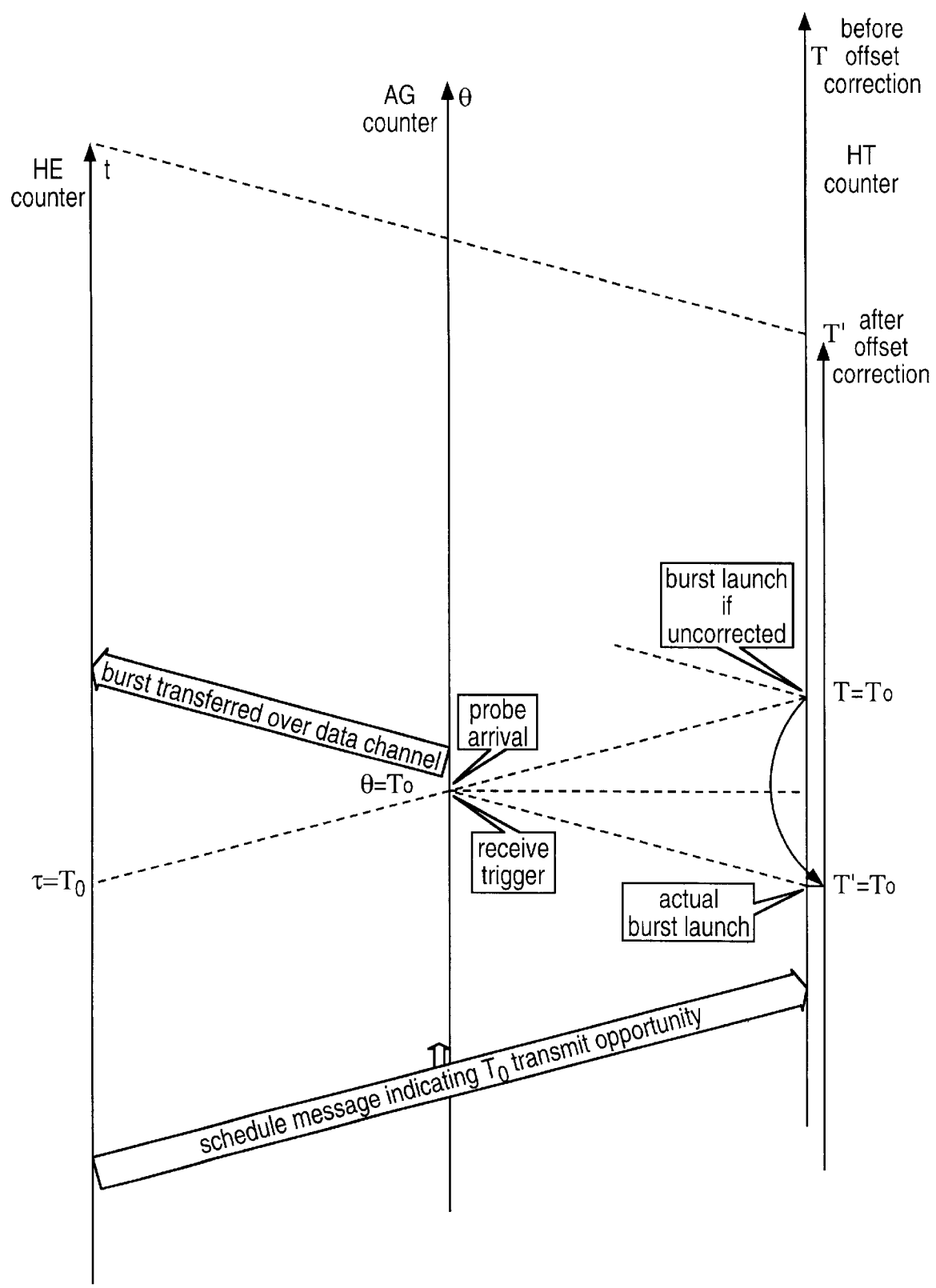

Let the three local times (readings of the respective timebase counters) be t, θ, T at the HE, AG and HT respectively; see FIGS. 12a,12b wherein, the axes denote time. Absolute time means the HE clock time, referring to all actual time events.

The timebase sync launched at the HE time $t=t_s$ is received at the AG and HE respectively at absolute times $t=t_s+\tau_1$ and $t=t_s+\tau_1+\tau_2$ and it is right at these times (given that the processing delay is assumed zero) that the local clocks are set to read θ=$t_s$ and T=$t_s$ This sets the local clocks θ and T to run with lags $\tau_1$ and $\tau_1+\tau_2$ respectively with respect to the clock t, as shown in the figure. Also notice the relative lag between T and θ is $\tau_2$. Now that the timebases have been acquired, the AG and HTs may start their ranging and calibration processes. A schedule_message sent from the HE to the HTs is also intercepted by the AG. This message includes a schedule with a ranging interval containing an indication to the units in the field to transmit a probe pulse at nominal time $T_r$.

The AG is configured to interpret the nominal time $T_r$ in the transmitted schedule as its local time when the burst receive trigger should be activated. Compare this with the conventional HTs whereby the time $T_r$ is interpreted as the time of activation of the burst transmit trigger.

The burst receiver at the AG is then applied a trigger pulse at its local time $\theta=T_r$ corresponding to absolute time $t=T_r+\tau_1$. It is at this time that the AG expects a pulse from the HT, however given that we are in the midst of the ranging process, the actual arrival of a burst from the HT to the AG will occur some time later, as follows:

First given that the clock T lags the clock $\theta$ by $\tau_2$ then the T clock in the HT attains the value $T_r$ just $\tau_2$ seconds later at absolute time $t=T_r+\tau_1+\tau_2$, at which point as usual with HTs, a burst containing a upstream_ranging_probe is fired upstream. This burst reaches the AG an interval $\tau_2$ later, i.e. at absolute time $t=T_r+\tau_1+2\tau_2$ at which point its delay with respect to the receive trigger at the AG is $2\tau_2$.

This time difference between the actual time of arrival $t=T_r+\tau_1+2\tau_2$ and the expected time of arrival $t=T_r+\tau_1$ of the probe burst at the AG burst receiver is then recorded by the AG software as the Timing_Offset and its value is subsequently transmitted by the AG to the HE over the digital return path established between the AG and the HE. The information is transferred in a new special overhead message defined as per the teachings of this invention between the AG and the HE. Additional overhead messages from the AG to the HE containing Synchronization and calibration information will be eventually interspersed with the actual flow of data as we shall see below. These messages pass embedded in the digital upstream through the new digital input adapter of the ITS at the HE, and are decapsulated by the ITS and fed to the same entity in the ITS that would have normally received the timing offset measurement which would have been locally supplied by the burst receiver in a conventional HE. Unaware that the Timing_Offset measurement came from afar, from the agent in the node rather than from local burst receivers, the standard ITS algorithm then continues it internal workings as usual, embedding the Timing_Offset value in a downstream_calibration message instructing all HTs to additively correct their local timebases by this amount. The modified AG demodulator is programmed to ignore this instruction.

The ranging and calibration procedure is now complete. The timing of bursts transmitted by the HTs should be received at the burst receiver in the AG with zero offset. To confirm this consider now a new schedule being sent by the HE to the HTs and AG, containing an indication of the time To at which a particular HT is supposed to fire a burst upstream. As shown in the figure the AG intercepts this and activates the receive burst at its own local time $\theta$=To whereas the HT fires at its corrected time T'=To.

If the clock were not corrected the HT would fire at time T=To which is illustrated as aligned on a diagonal secant passing through the points t=To and $\theta$=To (the time marked "burst launch if uncorrected"). However, the clock correction amounts to adding offset $2\tau_2$ to the local clock T of the HT, which means advancing the clock by this amount. This is indicated in the figure by a curved arrow jumping downward spanning a segment $2\tau_2$ from the point labeled T=To to the point labeled T'=To.

The actual time when T'=To occurs (marked "actual burst launch") now precedes the time when $\theta$=To by $\tau_2$.

This means that the transmit pulse fired at T'=To at the HT propagates upstream taking a time interval $\tau_2$ to reach the AG just in time for coinciding with the receive trigger of the AG burst receiver (the coincidence of the "probe arrival" and "receive trigger" times). Therefore the timing offset is now zero, and any transmission intended scheduled to reach the agent at a generic time To, indeed reaches the agent at that local time, aligned with the corresponding receive trigger. Therefore, no collisions will occur in the reservation mode, as in this mode the schedules make sure that bursts from different modems always occur in disjoint intervals. Likewise any contentions occur during well confined time intervals as specified by the schedule, not overlapping any other intervals.

One difference with respect to a conventional network is that now all bursts are aligned at a different location than the HE, namely at the AGs. All bursts arrive at the generic times To specified in the schedules, however at the AGs rather than at the HE. This means that an additional delay is incurred with respect to the nominal times of the schedule, reflecting the time that it takes the information bursts to propagate back from the AG to the HE via the digital link. The propagation component of this delay is of the order of 0.5 msec for a 100 Km span system, but there may also be a variable component to this delay if the digital upstream transmission link includes for example statistical packet multiplexing. Notice that this extra delay is inconsequential as delays of the same order of magnitude or greater normally occur within the burst receiver buffers of a conventional HE ITS.

Additional Timing Analysis

The following is an additional timing analysis taking into account the effect of various processing delays in the AG and HTs in addition to the propagation delays, which were the only factors considered in the above simplified model.

The phases of network operation are as follows:

First both the AG and the HT acquire synchronization by locking their respective timebases to a sync overhead message transmitted at time $t=t_s$ which is received at the AG at time $$t=t_s+\tau_1+\tau^R_{AG}$$

while it is received at the HT at time $$t=t_s+\tau_1+\tau_2+\tau^R_{HT}$$

This means that the respective local clocks for the agent and home terminal are:

$$\theta=t-(\tau_1+\tau^R_{AG})$$

and $$T=t-(\tau_1+\tau_2+\tau^R_{HT})$$

Conversely $$t=\theta+(\tau_1+\tau^R_{AG})$$

and $$t=T+(\tau_1+\tau_2+\tau^R_{HT})$$

The relationship between the two clocks $\theta$, T is then:

$$T=\theta-(\tau_2+\tau^R_{HT}-\tau^R_{AG})$$

and conversely $$\theta=T+(\tau_2+\tau^R_{HT}-\tau^R_{AG})$$

Now prior to the ranging process, a schedule is transmitted to both the AG and all the HTs, specifying a ranging interval to start at the nominal time $T_r$.

The AG demodulator skips the ranging procedure but extracts from the schedule the nominal time $T_r$ indicating when the Ranging Interval is supposed to commence. The AG then applies a receive trigger pulse to its local burst receiver at its local time $\theta=T_r$. This burst receive trigger event occurs at actual time (the subscript r indicates Ranging):

$$t_r^{AG}=\theta+(\tau_1+\tau^R_{AG})=T_r+(\tau_1+\tau^R_{AG}).$$

The very same schedule that was intercepted by the AG is interpreted at the HT in the usual way to mean transmission of an upstream_ranging_probe according to the HT's own clock. The moment when the HT's clock attains the value $T=T_r$ is the point in time when a transmit trigger pulse is generated in the HT to initiate an upstream_ranging_probe:

$$t_r^{HT}=T+(\tau_1+\tau_2+\tau^R_{HT})=T_r+(\tau_1+\tau_2+\tau^R_{HT}).$$

The time when this upstream ranging message arrives at the burst receiver is (the double rr subscript indicates actual reception, the single subscript indicates expected arrival):

$$t_{rr}^{AG}=t_r^{HT}+\tau^T_{HT}+\tau_2=T_r+(\tau_1+\tau_2+\tau^R_{HT})+\tau^T_{HT}+\tau_2=T_r+\tau_1+2\tau_2+\tau^R_{HT}+\tau^T_{HT}$$

The difference between this arrival time at the AG and the time of the burst receive trigger is equal to the ranging offset:

$$\text{Timing\_Offset}=t_{rr}^{AG}-t_r^{AG}=(T_r+\tau_1+2\tau_2+\tau^R_{HT}+\tau^T_{HT})-(T_r+\tau_1+\tau^R_{AG})=2\tau_2+\tau^R_{HT}+\tau^T_{HT}-\tau^R_{AG}$$

Subsequently, this Timing_Offset value as measured by the agent is transmitted back to the HE over the digital return path, embedded in an overhead message.

Then this value is embedded by the HE in the downstream_calibration message but the Agent which receives this message ignores it. It is intended for the HT which is in the process of ranging. Upon receipt of the Timing_Offset the HT loads this offset value in its offset accumulator, thus correcting its local timebase by this amount.

This correction corresponds to replacing the local time T at the HT with a corrected local time T' given by:

$$T'=T+\text{Timing\_Offset}=[\theta-(\tau_2+\tau^R_{HT}-\tau^R_{AG})]+2\tau_2+\tau^R_{HT}+\tau^T_{HT}-\tau^R_{AG}=\theta+\tau_2+\tau^T_{HT}$$

or conversely $$\theta=T'-(\tau_2+\tau^T_{HT})$$

Now the system is ready to start calibrated transmissions during the transmit intervals specified by the schedule. Let To be a generic time specified in a subsequent schedule, which is transmitted downstream to all HTs but also intercepted by the AG.

Interpreting the schedule, the AG applies a receive to its burst receiver at local time $\theta_o^{AG}=To$ Elsewhere, a transmit trigger is applied at the HT at the local (ranging corrected) time T'=To which if referred to the AG clock occurs at AG time:

$$\theta_o^{HT}=T'-(\tau_2+\tau^T_{HT})=To-(\tau_2+\tau^T_{HT})$$

This is the departure time of the burst at the HT, referred to the agent time. The arrival time at the AG occurs $\tau_2+\tau^T_{HT}$ seconds later, i.e. at AG time:

$$\theta_{oo}^{AG}=\theta_o^{HT}+\tau_2+\tau^T_{HT}=To-(\tau_2+\tau^T_{HT})+\tau_2+\tau^T_{HT}=To$$

It is apparent that the arrival at the AG is concurrent with the receive burst application, i.e. the offset at the AG is now nulled out: $\theta_{oo}^{AG}-\theta_o^{AG}=0$.

Therefore the receptions at the AG precisely coincide with the trigger pulses and to the nominal times specified in the schedule. This ensures operation of the system exactly as in the conventional case (lumped ITS), given that the times in the schedule are interpreted not as t but rather as $\theta$, namely not as HE arrival times but rather as agent arrival times, i.e. all schedule times are shifted according to a fixed amount $t=\theta+(\tau_1+\tau^R_{AG})$.

This should not pose a problem since the important effect is that all packets are aligned and their arrival is arbitrated according to a schedule, such that transmissions in reservation mode fall in disjoint intervals and transmissions in contention mode occur in well defined contention intervals, albeit the plane where this occurs is now at the agent rather than at the head-end.

The results of this last analysis indicate that operation is unaffected by the presence of fixed processing delays in the HT and the AG, i.e. there are no special measures necessary to calibrate out these fixed processing delays.

Operation of the Distributed Synchronization and Calibration Protocol

Aspects of the present network pertaining to the timing relationships between the three entities HE, AG and HT have been covered above. The following describes elements and principles of the timing synchronization.

While the AG includes a cable demodulator, a difference between the AG and conventional demodulators as in the HTs, is that the AG demodulator should ignore the ranging procedure. There is a further modification of the AG demodulator algorithm to include functionality allowing it to interface with the MAC at the head-end, specifically with the MAC entity conventionally responsible at the head-end for initializing the burst receivers for measurements and acquiring these measurements.

The AG behaves like a conventional head-end ITS, except that it does not supply the schedules to the HTs which are rather provided by the head-end. It is also the head-end which supplies the overhead messages containing the offset correction information. The head-end must work in coordination with the AG, wherein the actual measurements of offsets between the actual and intended burst arrivals occur. These measurements are transmitted upstream on the new digital link from the AG to the head-end, to be then reflected back downstream by the head-end, enabling the HTs to correct their clocks. Furthermore the AG has to initially acquire timebase as any other HT would in order to perform its offset measurement function along with the subsequent detection of working bursts at the times specified by the map. However, as mentioned above, the AG differs from a conventional HT in that it does not perform a ranging operation. From the viewpoint of the measurement and calibration of the offset attributes, consider the combination of AG and head-end as a long distributed ITS which internally runs its own internal link between the point of measurement (the burst receivers in the node) and the point of processing (the MAC algorithm in the HE), but appears externally to the HTs as a normal ITS albeit of an elongated shape.

In accordance with the invention, the conventional design of the HE ITS MAC is substantially unchanged. The only necessary modifications are the introduction of the upstream format adapter interface allowing to take in a digital rather than an RF upstream input, and the proprietary digital link enabling the HE MAC to obtain the overhead information from the AG burst receivers. The burst measurement information is then presented to the HE ITS at the appropriate access point of the MAC layer. The entity processing within the head-end MAC the measurements information is the same one which is in charge of interpreting the burst receiver measurements in conventional ITS systems, from which point the HE algorithm proceeds as usual to close the loop to the HTs by sending downstream overhead messages.

Notice that the DOCSIS and DVB standards do not mandate how the ITS is internally built; only the external characteristics are defined. While the ITS portion residing at the head-end is modified with respect to prior art interpretations of the standard, viewed as a whole the HE equipment plus the AG at the node plus the connecting links is considered as a distributed extended ITS, and this ITS as a whole, albeit of substantial length dimension, does strictly conform with the DOCSIS and DVB-RC standards, respectively.

Finally, the HTs are unaware that the loop on offset measurements is closed in a distributed way involving the AG and the HE. This is because the HE with the assistance of the AG prepares the same downstream messages as in a conventional ITS system. It is just that the plane where the timing measurements is made by the ITS has been moved from the head-end to the node. Unaware of this, and fed by the customary overhead messages coming from the HE, the HTs follow their standard algorithm by applying the communicated timing correction. This is a substantial advantage, because conventional standard home terminals may be used.

Distributed Calibration of Other Offset Attributes

The above refers to the timing calibration, but a similar RF power level and frequency deviation calibration is executed with respect to other offset attributes included in particular in the DOCSIS standard.

The expected values of power and frequency are transmitted by the head-end to the AG appended to the same conventional downstream MAP message that specifies the initial ranging interval. This enables the AG to initialize the burst receiver with the frequency and power parameters prior to the reception of the upstream_ranging_probe.

The respective ratio or difference of the actual parameters with respect to the expected parameters are measured by burst receivers, and the agent software communicates the measurements information over the digital upstream channel to the head-end. This information is deencapsulated from the upstream overhead message and is converted to be presented to the ITS software in exactly the same way that the equivalent information would be input in the case of a conventional ITS (wherein this information would be obtained from the local burst receiver rather than coming over a remote link).

The ITS in turn acts conventionally, preparing a downstream message indicating the corrections to be made to the offset attributes by the HTs.

Internal Communications Within the Distributed ITS and the Protocol Stack

Figure 13A:
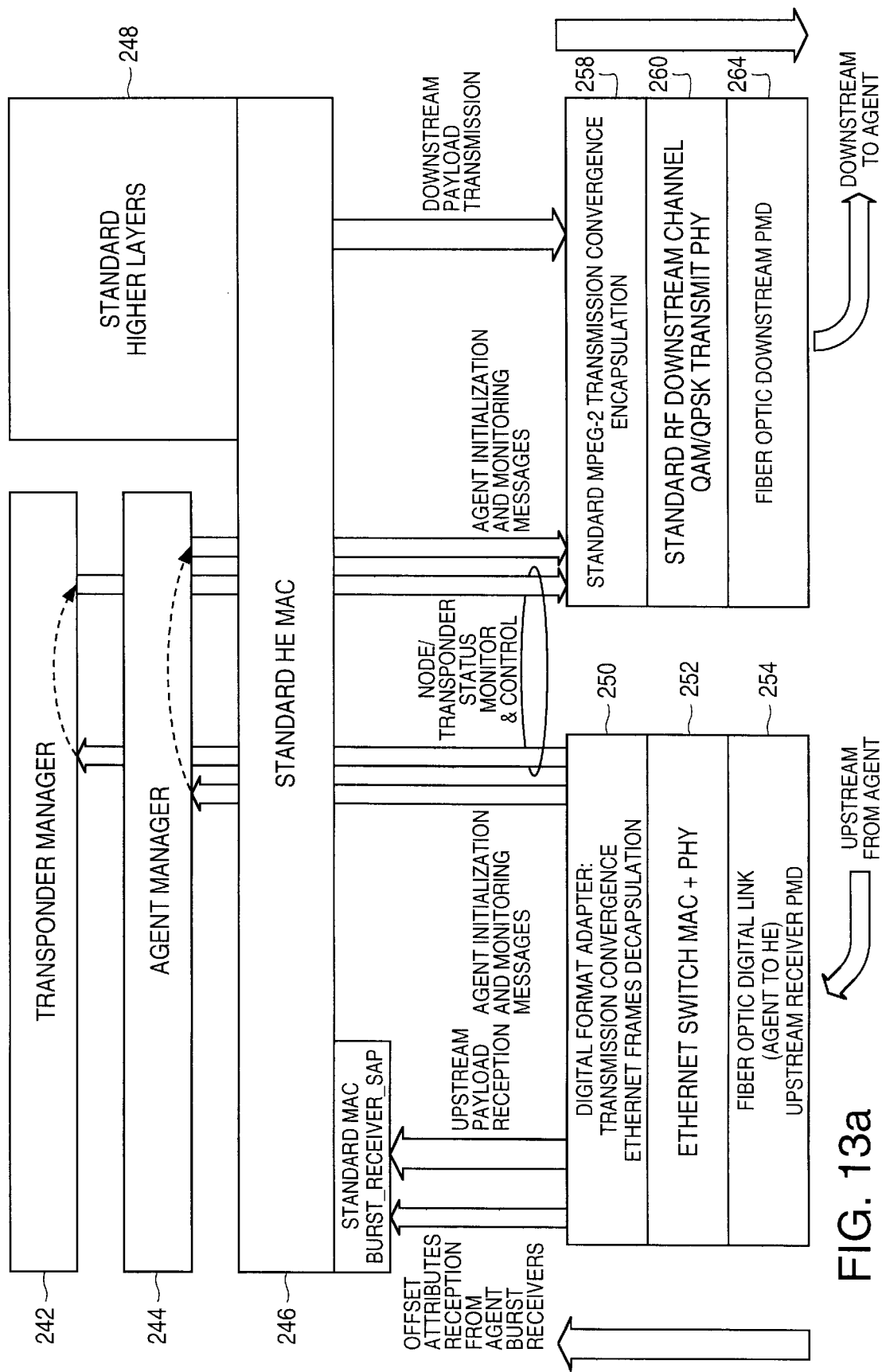
FIGS. 13a, 13b show protocol flow for the present system.
Figures 1, 13B:
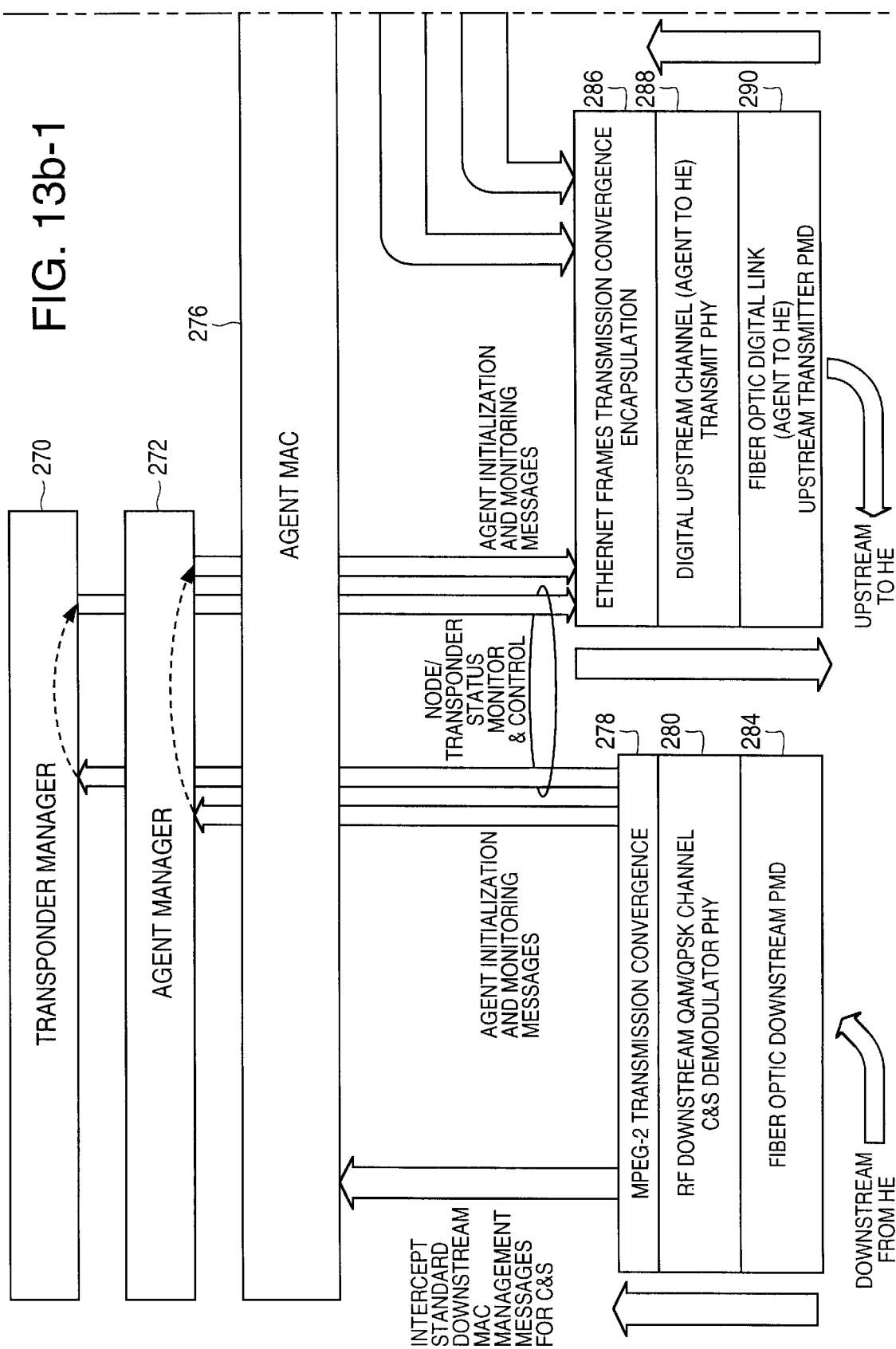

Proper establishment is accomplished of the two-way internal link within the distributed ITS (FIG. 7), between the HE MAC layer and the AG burst receivers in the node, and the associated internal distributed protocols. The flow of messages between the three levels (HE,AG,HT) and the protocol stack are shown in FIGS. 13a, 13b. FIGS. 13a, 13b illustrate those protocols (software) where FIG. 13a is at the HE and FIG. 13b at the fiber node. Writing the actual software code to carry out these protocols would be routine for one of ordinary skill in the art in light of this disclosure. This software is executed by microprocessors (or equivalent) located in the head-end and in the AG. The downstream flow from head-end to AG is over the QAM/QPSK downstream channel, whereas the upstream flow from AG to HE is over the dedicated digital upstream channel running through Ethernet transmission convergence or equivalent layers as described above. The AG also receives upstream transmissions from the HTs over the QPSK/QAM-16 upstream channel.

In both directions between the head-end and AG, a portion of the bandwidth is devoted to proprietary management messages associated with the agent MAC and agent manager and transponder manager further described below. Each of the upstream and downstream paths is then effectively partitioned into several virtual data links, carrying, in addition to the data payloads, the various types of overhead and management messages.

FIGS. 13a, 13b are largely self explanatory. In FIG. 13a, the transponder manager 242 refers to the entire entity. Below this is the agent manager 244, below which are the conventional (standard) HE MAC 246, with which are associated the standard higher layers 248, all as described above.

To the left, coming upstream from the agent AG, there is the digital format adapter 250 which performs transmission convergence and encapsulation of Ethernet frames. Below this is the Ethernet switch and physical layer 252, below which is the fiber optic link 254, including the receiver PMD (physical medium dependent layer). (The arrows show flow of data and messages.) The downstream flow (lower right of figure) includes an MPEG-2 transmission convergence and encapsulation layer 258, the downstream QAM/QPSK channel 260, and the fiber optic Physical Medium Dependent layer 264.

In FIG. 13b, the elements are similarly arranged.

The calibration and synchronization process is based on interception by the AG of the regular downstream overhead messages for the HT, e.g. the initialization_message and schedule_message, as well their interpretation by the AG in a modified way, different from the standard practice in the HTs. Additional agent specific overhead is transmitted on the downstream channel.

At the node, the AG MAC and AG Manager of the protocol stack are designed to extract from these downstream overhead messages trigger and initialization information for application to the burst receivers in the agent.

In the reverse direction the calibration and synchronization process is enabled by an overhead service channel over the digital return path from the AG to the HE, allowing to transport back to the HE the measurements taken by the burst receivers and other status information. This AG overhead flow is shared in the upstream AG to HE link with the data transport of upstream payload burst packets. The AG overhead to be transmitted upstream consists of two types of information, on two different time scales. On a faster scale it comprises the measurements of the offset attributes by the burst receivers in the node, and on a lower scale the status information about all elements in the agent. The structure of the AG overhead protocol data units to be encapsulated in the "carrier" Ethernet frames is proprietary, but it may be desirable to standardize the formats.

The AG to HE digital return path utilizes a transmission convergence layer 286, 250, which encapsulates DOCSIS or DVB-RC standard upstream data as well as standard MAC management frames at the fiber node onto "carrier" Ethernet frames to be transported to the head-end and routed there to the proper service access point in the MAC at the HE.

Since, for example, DOCSIS itself uses Ethernet framing for its upstream messages, this results in the inner DOCSIS Ethernet frames encapsulated within outer Ethernet frames.

Another virtual channel in the system, as illustrated in FIGS. 13a, 13b, is for fiber node status and control management, a function accomplished by the transponder manager layer 270, 242. In conventional cable systems nodes, power supplies and other elements in the field are managed by transponders, which are units inserted in each field element and including sensors and activation elements for the gathering of telemetry information and the application of the control functions. The two-way communication necessary to transport the telemetry and control information to/from the head-end is provided by a modem included in each transponder. Each modem typically occupies a small dedicated frequency band in the upstream and downstream channels, and polling or TDMA protocols exist for having multiple transponders share the same frequency band.

In the present network the modems can be eliminated from transponders in fiber nodes which include AGs. Instead, the two-way communication path between the HE and AG can be shared to provide, in addition to its functions detailed above, two-way transponder communications over one of the several virtual links. The upstream Ethernet transmission convergence encapsulation is then also applied to the transponder and agent overhead upstream channels, while in the downstream the transponder and agent managers 242, 270 and 244,272 are virtually treated as standard HTs as described below.

The virtual channels carrying the data and various types of overhead may terminate at various levels in the protocol stack, for example in the upstream the outputs of the burst receivers in the AG (data and offset attribute measurements) can be each associated with a particular logical port out of several ports multiplexed at the logical link control (LLC) level over the same Ethernet MAC address of the appropriate ITS module at the head-end which listens to a particular AG. Alternatively the burst data and offset attributes may be multiplexed in a single frame format and then transported from the AG to the HE over a single LLC virtual link running over the Ethernet encapsulation.

In the case of AG and transponder overhead messages, these can be assigned in the DOCSIS standard to separate SIDs (Service IDs) while in DVB-RC standard separate ATM VCI/VPI virtual circuits may be used. This means that the head-end treats the AG and transponder overhead node entities as virtual home terminals. The upstream transmissions from these modules terminate at levels higher than the MAC level, traversing the MAC entity on their way down and up.

Distributed Synchronization and Calibration Protocol

The following describes the sequence of states of the distributed synchronization and calibration protocol for initialization, ranging and calibration of the system. The generic message names applying to the respective DOCSIS and DVB standards are used as follows.

initialization_messages
      Upstream_Channel_Descriptor in DOCSIS
      MAC_Provisioning_Channel_Message &
      MAC_Default_Configuration_message in DVB
    schedule_message
      allocation MAP in DOCSIS
      b0–b7 bits in MAC flags in ESF frame & MAC_Sign-on_Request_Message in DVB
    upstream_probe
      Ranging_Request (RNG_REQ) during "Init Maintenance" transmit opportunity in DOCSIS
      MAC_Sign-on_Response_Message in DVB
    downstream_calibration
      Ranging_Response (RNG_RSP) in DOCSIS
      MAC_Ranging_and_Power_Calibration_Message in DVB
    upstream_calibration
      Ranging_Request transmitted during "Station Maintenance" transmit opportunity DOCSIS
      MAC_Ranging_and_Power_Calibration_Response_Message in DVB
    initialization_complete
      RNG_RSP with "success indication" in DOCSIS
      MAC_initialization_complete_Message in DVB Outline of the protocol:
1. HE transmits initialization_messages
2. HT and AG demodulators lock onto the appropriate downstream provisioning channel
3. The AG receives proprietary monitoring and control initialization information for the node, agents, burst receivers over the service overhead channel allocated over the QAM/QPSK downstream channel.
4. HE MAC SW prepares a schedule and transmits the schedule_message
5. HTs and AG intercept the schedule_message over the downstream QAM provisioning channel
6. AG MAC SW interprets the schedule_message by preparing a schedule queue.
7. HT transmits upstream_probe burst at a ranging interval transmit opportunity as indicated by the schedule queue.
8. The upstream_probe burst arrives at the AG burst receiver and its offset_attributes are measured
9. The upstream_probe and its offset attributes are transmitted upstream to the HE MAC over the proprietary digital upstream service overhead channel.
10. HE MAC transmits downstream_calibration message (as per standard ITS operation) including the offset_attributes corrections.
11. HT receives this message and corrects its offset_attributes.
12. HT transmits upstream_calibration message using the corrected attributes
13. AG receives the upstream_calibration message and re-measures the offset attributes.
14. The upstream_calibration message and its offset attributes are transmitted upstream to the HE MAC over the proprietary digital upstream service overhead channel
15. If attributes are not within expected range then repeat steps 10–14.
16. initialization_complete message is sent to the HT.

It is apparent that the two way conventional protocol between the HE and the HTs is replaced by a more complex three-way protocol involving the HE, AG and HTs, with the three entities exchanging data over the upstream and downstream standard channels as well as over the upstream service overhead channel.

The two-way overhead flow described above then includes a downstream portion which comprises in its simplest form standard ITS operation but modified AG operation, whereas in both directions a proprietary service overhead link is established over the digital upstream channel from the AG to the HE. This two-way overhead service channel allows "tricking" the ITS system at the HE into "thinking" that the burst receiver resides locally, as well as tricking the HTs into "thinking" that they are managed by a standard ITS. The two-way overhead channel further allows monitoring and control of the node and AGs.

Exemplary Implementations

The following describes exemplary network implementations:

1. "scaleable" network:

A network requiring a less extensive initial investment, but still allowing migration to higher performance by a gradual upgrade of existing network capabilities and continuous evolution towards higher bandwidth per subscriber and/or larger service penetration, corresponding to gradual reduction in the size of the narrowcast domains. The prior art HFC infrastructure is used, except that the conventional fiber nodes are replaced with "digital scaleable nodes" containing one or more AGs. The scalability is obtained by means of starting with a single AG in the node, then adding more AGs and/or replacing the AG(s) with one(s) containing more burst receivers.

2. "deep fiber" network:

A network requiring a higher initial investment, but providing substantially more bandwidth to begin with. This system requires a complete overhaul of conventional HFC networks by removing the RF amplifiers, and laying out additional fiber to interconnect two types of new equipment: the TDMH (TDM Hub) and Deep Fiber Nodes, each containing at least an Interactive Agent. This is the best option for constructing a new HFC system from scratch, or upgrading a one-way system for two-way capabilities, or for embarking on a grandiose network upgrade providing enough bandwidth per subscribers for years to come.

"Deep Fiber" Network

Figure 14:
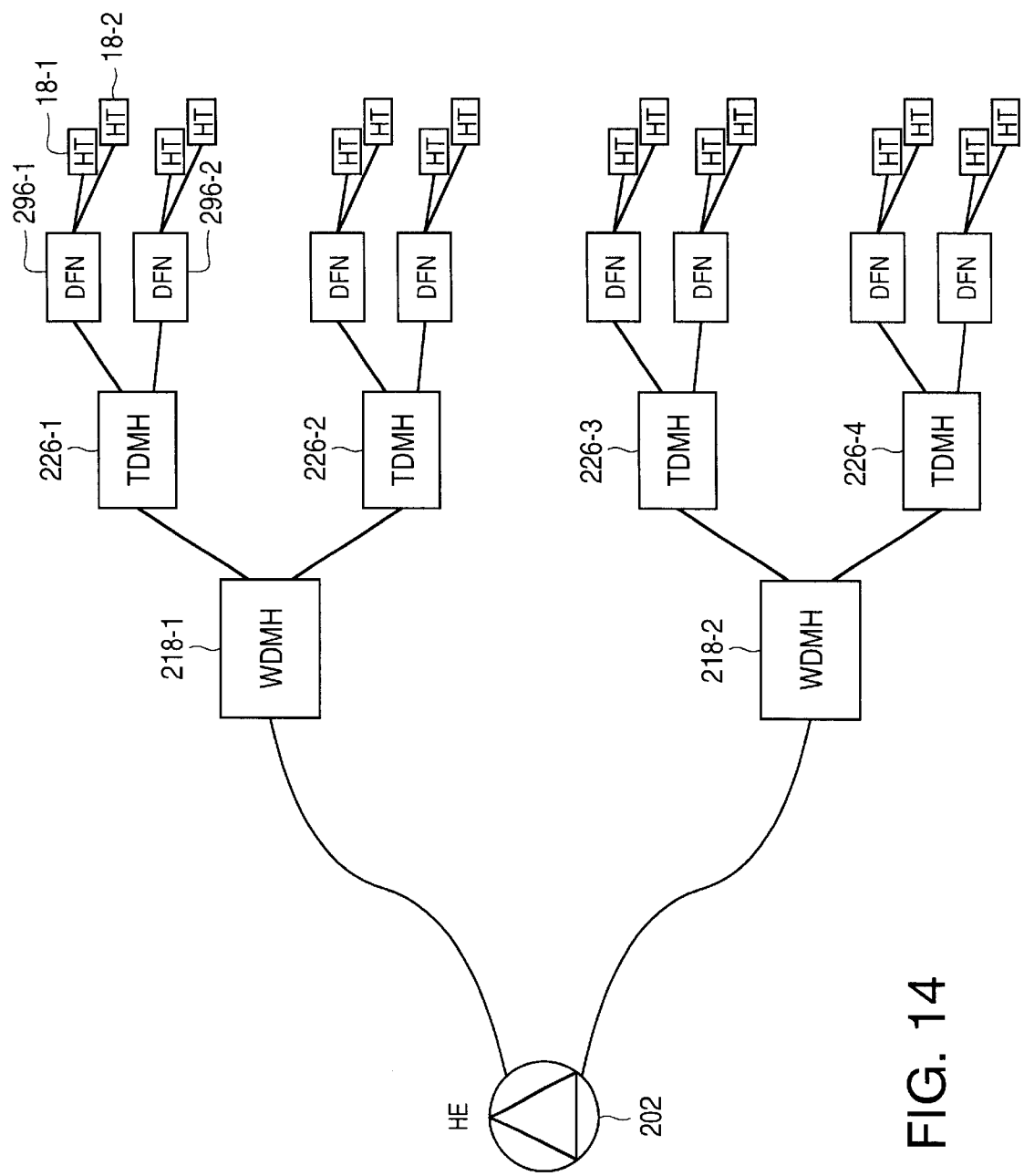
FIG. 14 shows a deep fiber network.

Such a network is shown in FIG. 14, including most of the same elements as FIG. 9, except that here the deep fiber nodes are 296-1, 296-2, etc.

The levels of the hierarchy are:

the HE 202 the WDM Hubs (WDMH) 218-1, 218-2, etc.

the TDM Hubs (TDMH) 226-1, 226-2, etc.

the Deep Fiber Nodes (DFN) 296-1, 296-2, etc.

the Home Terminals (HTs) 18-1, 18-2, etc.

DOCSIS cable modems

DVB set-tops

Legacy terminals

Optical fiber is used to interconnect the HE, WDMHs, TDMHs, DFNs. From the DFNs to the home, passive coaxial cable and RF taps are used, i.e. all RF amplifiers are eliminated providing greater reliability for the system. The coaxial cable ("coax") is all passive and optical fiber is brought all the way to the passive coax in three segments, first via the WDM hubs, then through the TDM hubs and then to the DFNs. The number of HTs passed in each upstream narrowcast domain is of the order of several tens, and the amount of return path bandwidth is several tens of MHz. Therefore this provides a very high performance return path. The downstream path is also of high performance as the downstream narrowcast domain is determined by the number of subscribers fed downstream by a single TDMH, i.e. the union of the domains covered by all the DFNs connected to a single TDMH. Though the downstream narrowcast domain is bigger than the upstream domain, (e.g. if ten deep fiber nodes are used per TDMH then there are several hundred homes passed per TDMH this might not be excessive given the higher spectral efficiency of QAM (e.g. given the excellent analog qualities of the signal 256-QAM may be used with efficiency of close to 8 bits/sec per Hz, vs less than 2 bits/sec per Hz for QPSK in the upstream) and more bandwidth is available downstream. The bandwidth provided downstream may be eventually expanded to hundreds of MHz, as analog channels get eliminated and more of the downstream RF spectrum starts being allocated for narrowcast digital transmission.

New elements described in detail are the deep fiber nodes and TDMH.

Deep Fiber Node

The deep fiber node 296 (see FIG. 15) includes a number of the same elements as generic fiber node 194 of FIG. 7, similarly labeled. It operates as follows:

There is one or more, e.g. four RF input/output ports 59-1, 59-2, etc., on the right, each of which is the root of a passive coaxial cable branch structure creating two way electrical connectivity with end user HTs. Over the RF ports connected to the diplexers 59-1, 592, etc., a 50 to 750 MHz (or 870 MHz in Europe) spectrum allocated to analog broadcast AM-VSB channels and digital narrowcast QAM modulated channels is transmitted downstream, while upstream signals in the lowband range of 5 to 42 MHz (or 5 to 70 MHz in other places) are collected from the home terminals.

Figure 15:
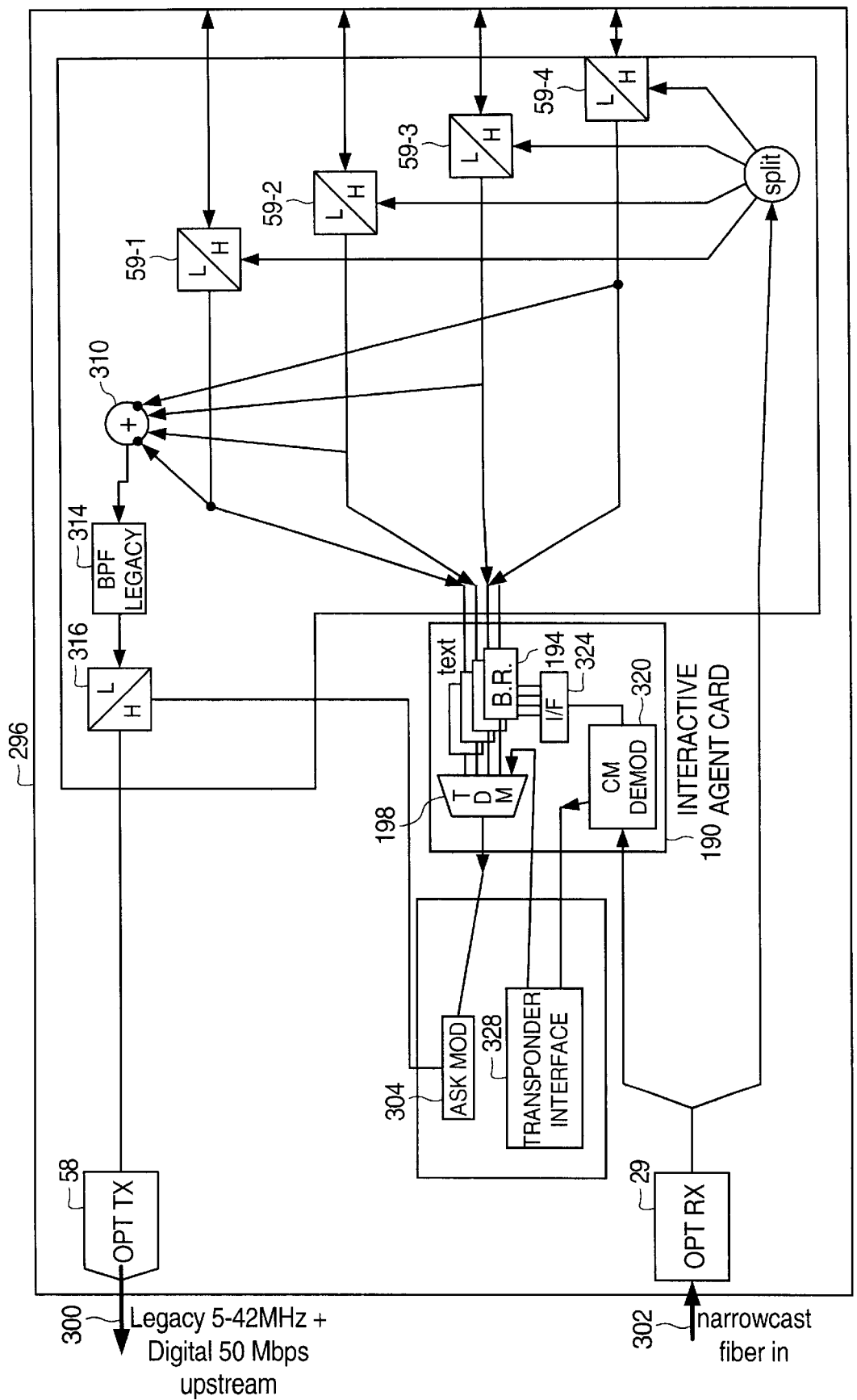
FIG. 15 shows a node (DFN) for the FIG. 14 network.

The other input/output port is to an optic fiber over which the downstream signal is received in the deep fiber node on one wavelength and the analog legacy plus digitally detected return path signals are transmitted upstream on the other wavelength. Coarse DWDM may be used for full duplex optical transmission over the single fiber. Alternatively two separate optical fibers 300, 302 may be provided, as depicted in FIG. 15.

The following is for the case of a network with DOCSIS modems and DVB-RC or DAVIC set-tops, but could be a network with DVB-RC modems and DVB-RC set-tops or any other combination. What changes depending on the home terminal deployed are the type of AGs used and their location. The AG 190 devoted to the cable modems must be placed in the deep fiber node, whereas the agent devoted to the settops, which represent a larger narrowcast domain, may be placed further upstream in the TDMH.

There is a single interactive AG 190 in the deep fiber node. In the example shown, it is a DOCSIS AG with four burst receivers 194, each connected to one of four digital RF inputs via the four diplexers L/H 59-1, 59-2, etc.

The diplexer is a well known passive three port element acting as a lowpass filter on one path and as a high path filter on another path (low pass filter with respect to input from right to left and output horizontally to the left, and high pass filter with respect to vertical input, and output horizontally to the right).

The diplexers are designed to pass the entire upstream RF lowband towards the burst receivers 194 ("B.R.") which perform digital detection. The digital outputs of the burst receivers are collected by the TDM multiplexer 198 which is an Ethernet packet multiplexer, encapsulating the detected bursts of data and service overhead information in "carrier" Ethernet packets of appropriate MAC address (addressed to a particular HE ITS module which is assigned to cover the particular MAC domain corresponding to deep fiber node. The TDM multiplexer 198 may also encapsulate in Ethernet packets the output of the transponder interface which provides general status monitoring and control to the whole deep fiber node.

The output signal of the TDM multiplexer 198 is fed into an ASK modulator 304, to upconvert the upstream digital transmission from the deep fiber node above the highest frequency of the legacy return spectrum which also needs to be transmitted upstream. This allows FDM multiplexing of the digital upstream transmission and the legacy return upstream transmission. To follow the legacy return spectrum, the Low outputs of the four input diplexers 59-1, 59-2, etc., are tapped and RF combined at adder 310 and then bandpass filtered by the RF band pass filter BPF Legacy 314, in order to remove the band devoted for DOCSIS transmission, and retain only the band devoted to "legacy" transmissions of home devices other than the DOCSIS transmission—this includes true legacy devices as well as the DVB home devices that need to be filtered through and carried over for detection at the TDMH.

The output signal of the BPF Legacy filter 314 is fed into the low frequency (L) input port of a diplexer 316, the output signal of which combines the low frequency legacy input signal and the high frequency (vertical) input signal from the ASK modulator. The combined output signal has a spectrum containing the "legacy" portions of the 5 to 42 MHz band while above 42 MHz it contains spectrum of the ASK modulated output of the TDM multiplexer 198.

Notice that a different bandpass modulation format could be applied to the output of the TDM mux 198, such as FSK, DPSK, QPSK, in which case 304 would be replaced by the appropriate modulator type, however ASK modulation is the simplest to implement.

The electrical signal at the output of diplexer 316 is applied to the optical transmitter 58 which is a DWDM (dense WDM) transmitter where WDM hubs are used to wavelength division multiplex from sets of DFNs. This transmitter 58 feeds a fiber 300 which in one implementation is used to transmit the digital plus legacy signal upstream over one wavelength (e.g., 1.3 $\mu$m) while in the reverse direction it is used to receive the analog broadcast plus digital narrowcast downstream signal over a different wavelength (e.g., 1.5 $\mu$m), a technique called Coarse DWM. The downstream signal is photodetected in the optical receiver 58 in the lower left comer of the figure.

Alternatively, two separate fibers 300, 302 are used respectively for the upstream and downstream transmissions, and in this case the optical transmitter 29 need not be of the DWDM type.

Alternatively, if no legacy signals need to be carried, it is possible to eliminate the ASK modulator 304, the diplexer 316, the four RF taps and their combiner 310 and the BPF Legacy filter 314. The transmission of the output of the TDM multiplexer 198 then occurs at baseband.

Alternatively, if legacy transmission carriage is still required, but a third fiber is available, then the FDM of the upstream digital and upstream analog legacy can be eliminated and replaced by SDM (Space Division Multiplex), i.e. two separate fibers may be devoted to carrying the two upstream digital and analog legacy transmissions.

The electrical output signal of the optical receiver 58 is split into two paths, one path is further split several ways (four in the illustrated example) and used as input to the high frequency ports of the four diplexers, 59-1, 59-2, etc., which are connected to the four RF ports.

Therefore, the downstream signal (analog broadcast plus digital narrowcast) which was photodetected at the optical receiver is injected into the downstream direction through the diplexers into the four RF ports to be transmitted to the HTs.

The second path split out of the output of the optical receiver 29 is fed into the CM demodulator 320 which serves for the calibration and synchronization of the interactive agent as already explained. The CM demodulator 320 tunes to one of the downstream channels which is defined as the provisioning channel, and executes the calibration and synchronization algorithm as already explained, using modified software executed on its microprocessor (not shown) to implement the AG MAC and AG Manager entities. The CM demodulator 320 also provides the trigger and initialization signals to the burst receivers 194 via a hardware interface 324 which is designed to suitably interface to the burst receivers according to the implementation of the burst receivers status and control signal.

The CM demodulator 320 also feeds calibration signals to the control terminals of the burst receivers as extracted from the CM demodulator's listening to the downstream transmission, and its associated software assists in presenting the measurements taken by the burst receivers to the TDM multiplexer for encapsulation in Ethernet frames.

The CM demodulator 320 also provides an output signal to the transponder interface 328, as a fraction of the downstream data capacity of the QAM/QPSK provisioning channel is devoted to pass proprietary status monitoring and control messages intended for the management of the whole deep fiber node via the transponder interface. The status monitoring loop is closed all the way to the head-end via the TDM multiplexer 198, over the digital upstream channel, i.e. upstream transmissions issued by the transponder interface are multiplexed along with the other transmissions by the TDM 198.

TDM Hub

Figure 16:
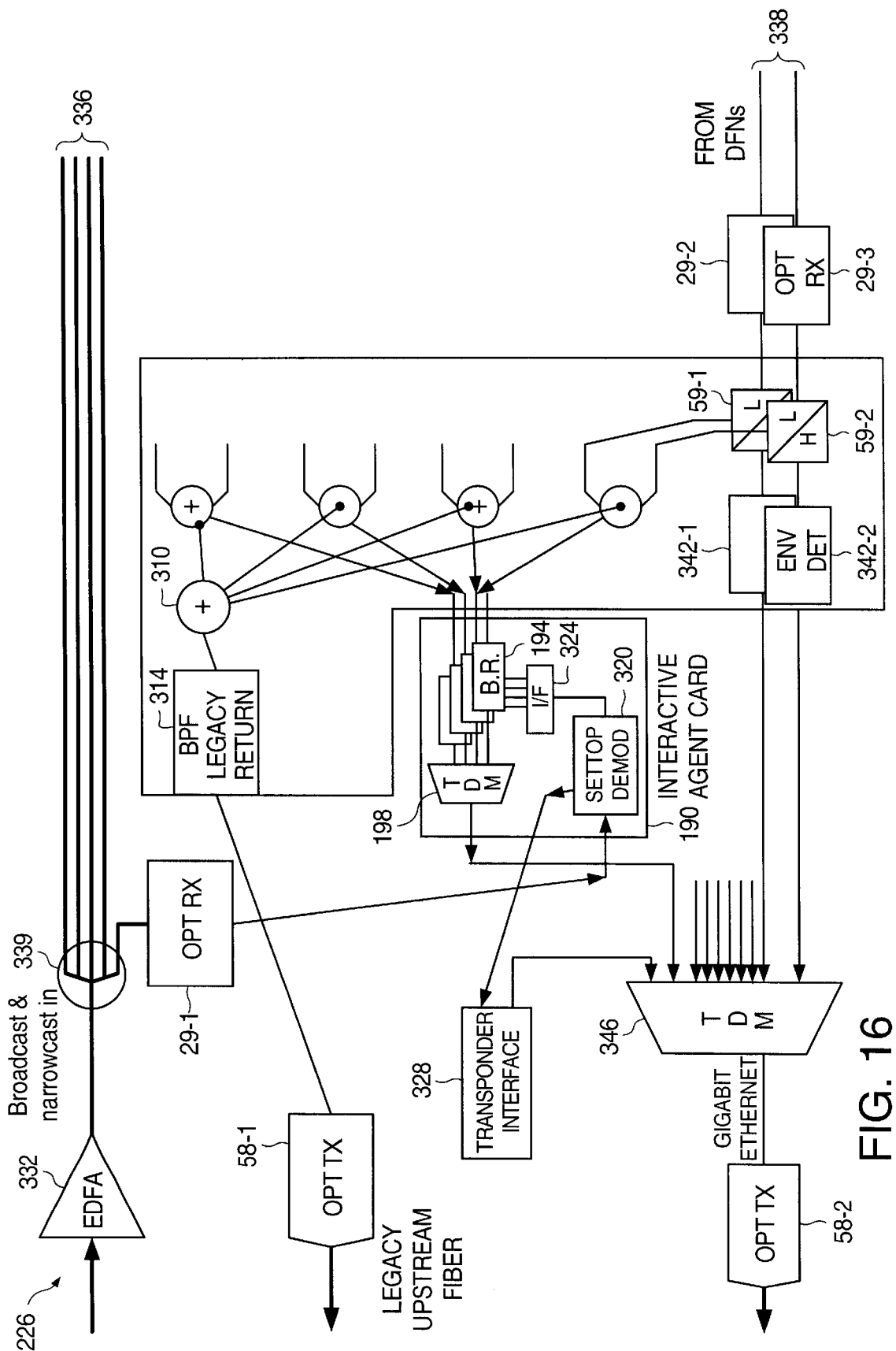
FIG. 16 shows a TDM network hub.

The TDMH 226 (see FIG. 16) serves two main functions—in the downstream path it is used to split the downstream optical signal to multiple deep fiber nodes served by the TDMH, replacing the chain of RF distribution amplifiers in conventional systems with an optical star structure, while in the upstream path it is used to multiplex the digital signals carried over the input fibers from multiple served deep fiber nodes into a single aggregate digital signal to be further sent upstream towards the HE. Some elements of the TDMH 226 are the same as that of the DFN (deep fiber node) of FIG. 15. A secondary function of the TDMH is the detection of returns from digital settops connected to the totality of DFNs served by the TDHM, while the individual DFNs detect the more dense cable modem returns by interactive agents in the DFNs. The settops' detection function is optionally performed by the settops' interactive agent 190, which can be eliminated if this function is not necessary.

All the input/outputs of TDMH 226 are over optical fiber. In the downstream path an EDFA 332 (Erbium doped fiber amplifier) optically regenerates the input downstream optical signal (carrying analog broadcast and digital narrowcast sub-carrier modulation) in order to allow it to sustain the splitting loss into multiple downstream fibers. This fiber amplifier may also be located outside the TDMH somewhere along the fiber connecting the WDMH with the TDMH, or in particular in the WDMH.

In the upstream path, multiple optical fiber input signals are photo-detected in upstream optical receivers 29-2, 29-3, (only two are shown, but the figure suggests eight fiber inputs in this example, coming from eight deep fiber nodes).

Each deep fiber node may use two separate optical fibers, one for upstream (digital plus legacy analog) and one for downstream or alternatively a single optical fiber multiplexing the upstream and downstream optical signals on two different wavelengths, or alternatively three fibers for the respective digital upstream, legacy analog upstream and downstream transmissions. It is the first case that is shown in the figure, namely two optical separate fibers per deep fiber node, the downstream one is taken from the group 336 of output optical fibers driven by the EDFA optical amplifier 332, while the upstream one is one of the fibers 338.

If the second option is used, namely wavelength division multiplexing of the full duplex optical transmission, each fiber 338 has to be combined with an optical fiber 336 using a Coarse DWDM (1.3/1.5 $\mu$m).

Recall that the subcarrier multiplexed signal recovered at the output of each upstream receiver consists of the legacy lowband and an upconverted ASK modulated signal.

Each RF input signal is passed through a H/L diplexer 59-1, 59-2. The horizontal path to the left through the diplexers 59-1, 59-2 implements a high pass filter, blocking the legacy lowband while passing through the spectrum of the ASK modulated signal. The envelope detector 342-1, 342-2 (each consisting in its simplest form of a diode, a capacitor, and a digital latch to recondition the signal) recovers a replica of baseband digital signal applied in the DFN to the ASK modulator (see FIG. 15). The output signal of each envelope detector 342-1, 342-2 is then essentially identical to the output signal of the TDM multiplexer in the corresponding deep fiber node (namely a sequence of Ethernet frames carrying the data detected by the burst receivers in the deep fiber node, as well as proprietary management information also encapsulated in Ethernet frames, related to the burst receivers and the deep fiber node).

The digital output signals of the envelope detectors (one from each deep fiber node) are then applied to the input terminals of the Ethernet multiplexer 346 which in one embodiment is a GigaBit Ethernet switch used as a multiplexer. The output signal of the Ethernet multiplexer 346, representing the aggregated digital upstream output from deep fiber nodes, drives an optical transmitter 58-2 which could be of the DWDM type if another stage of DWDM multiplexing is required.

Another input signal to the Ethernet multiplexer 346 comes from the transponder interface 328, used for monitoring and control of the local functions of the TDMH. This completes the description of the digital upstream path.

The photodetected electrical signals at the output terminals of the optical receivers 29-2, 29-3 are further separated into their low-pass components by the associated diplexers, of which filter out the high frequencies and pass the "legacy" low band to the vertical output ports. In the example shown, eight return path legacy signals must be mapped into four burst receivers 194 on a DVB-RC Interactive AG 190 circuit card. In this case every two signals each originating at one deep fiber node are summed and applied to a burst receiver. If the number of deep fiber nodes per TDMH and of burst receivers was different, a different combination ratio would be needed.

In this example, each of the burst receivers 194 then detects upstream transmissions from a narrowcast domain consisting of the union of the HTs (set tops) associated with the corresponding pair of DFNs. This decouples the size of the set-tops narrowcast domain dealt with in the TDMH from those of the cable modem narrowcast domains dealt with in the deep fiber nodes. A cable modem narrowcast domain is much smaller, corresponding in this example to a quarter of a deep fiber node, i.e. the domain for set-tops is eight times larger than that for cable modems.

The distributed calibration and synchronization function for the DVB AG 190 in the TDMH is accomplished by the set-top demodulator 320 which is fed by the electrical output signal of an optical receiver 29-1, which in turn is fed by one of the optical fiber output signals of the downstream fiber splitter 339.

The set-top demodulator 320 accomplishes the same functions as in the description of the AG in the deep fiber node. In particular it interfaces to the transponder interface 328, the output signal of which is fed into the Ethernet multiplexer 346. The transponder interface 328 provides general status monitoring and control for the TDMH 226.

Finally, in addition to DOCSIS cable modem returns detected in the AGs (included in the deep fiber nodes) and DVB settop returns (detected in the AG included in the TDMH) it is possible to have other types of "legacy" home terminals.

To deal with these legacy signals, the L output signals of the diplexers 59-1, 59-2 are combined in pairs (in this example) and split to feed both the burst receivers 194 for settops' detection, as well as another combiner 310 which is coupled to the input terminal of the BPF Legacy Return filter 314. This input signal represents a narrowcast upstream domain which is as large as the union of all deep fiber nodes served by the TDMH. All the legacy transmissions (non DOCSIS or DVB) from this domain are filtered using the BPF Legacy Return filter 314, and the filtered signal is applied to an optical transmitter 58-1 (which can be of the DWDM type) to transport it all the way to the head-end, where it is dealt with in the normal way to detect the legacy transmissions.

The legacy home terminals may also be detected using proprietary agents that can be installed aboard the TDMH in lieu of or in addition of the interactive agent 190, which may require apparent modifications of the RF splitting network. Another possibility is to narrow-band-pass-filter those transmissions from legacy home terminals and use a relatively narrowband PCM technique as described in the prior art, namely a fast A/D (analog to digital converter) unit the output of which is to be mapped into an Ethernet frame and also presented to the Ethernet multiplexer to be transported in digital form to the head-end along with the DOCSIS/DVB transmissions, where the PCM transmission is digitally demultipled then the reverse process of D/A is applied to regenerate the analog signal to be detected by the legacy head-end demodulators. If the bandwidth that carries the legacy transmissions is narrow enough, the application of the PCM technique may not be too wasteful of bandwidth, thus combining the best of this approach with the PCM technique.

"Scaleable" Network

Figure 17:
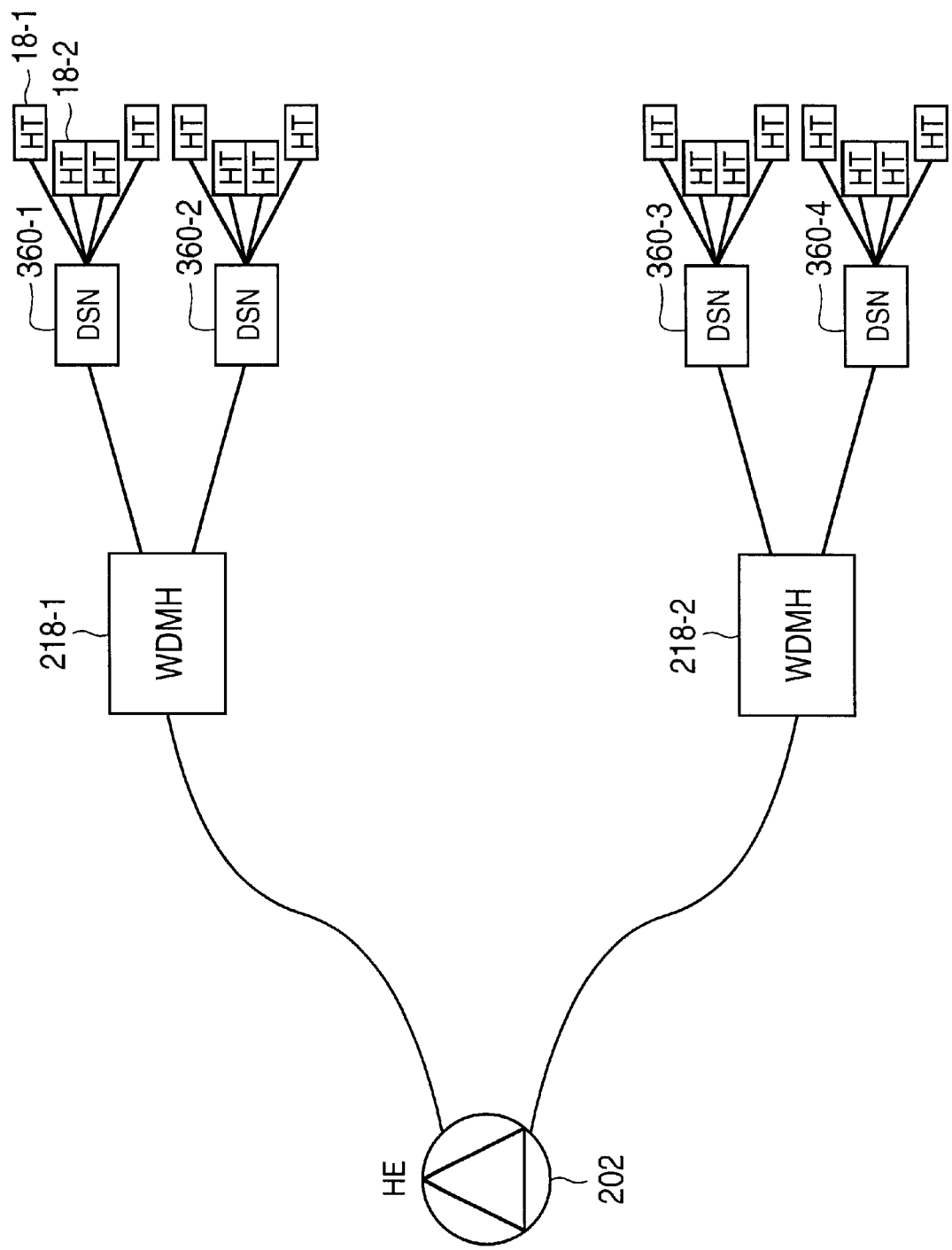
FIG. 17 shows WDM network.

A scaleable network is shown in FIG. 17 including a number of elements described above.

The levels of the network are:
 the HE 202
 the WDM Hubs (WDMH) 218-1, 218-2
 the Digital Scaleable Nodes (DSN) 360-1, 360-2, etc.
 the Home Terminals (HTs) 18-1, 18-2, etc.
  DOCSIS cable modems
  DVB set-tops
  Legacy terminals Optical fiber interconnects the HE, WDMHs, DSNs. From the DSNs 360-1, etc., to the HTs 18-1, 18-2, the regular cable distribution infrastructure of amplifiers (not shown) in tandem is used, and of course the amplifiers must be two-way. The RF installation is essentially kept the same as in conventional HFC systems, except that the conventional analog fiber nodes are replaced with DSNs 360-1, 360-2, etc. (located at a point in the network where 1000 to 3000 homes passed are concentrated over several RF branches), and the WDM equipment 218-1, 218-2 is installed in the secondary hubs (e.g., in the location of existing hubs which are emptied of equipment, as the ITS and VOD equipment is all moved to the head-end).

Digital Scaleable Node

Figure 18:
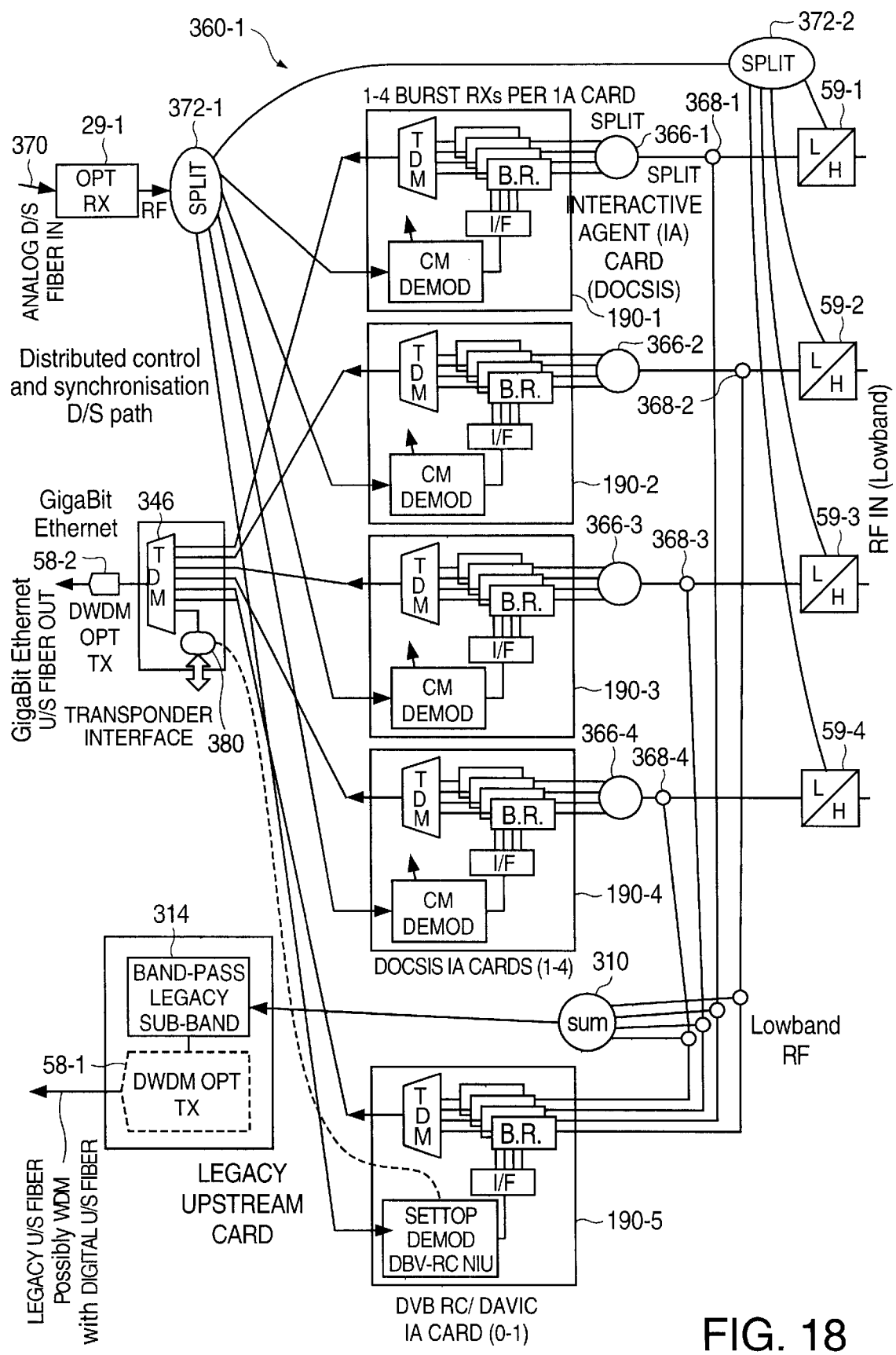
FIG. 18 shows a digital scaleable node containing interactive agents.

FIG. 18 illustrates the Digital Scaleable Node 360-1 (DSN) including a number of elements as described above. Four RF inputs ports are shown in this example, each connected to a diplexer 59-1, 59-2, 59-3, 59-4, the low frequency (L) output side of which couples the lowpass upstream signal to one DOCSIS interactive agent 190-1, etc., by means of an RF splitter 366-1, 366-2, 366-3, 366-4, which further splits the signal to four burst receivers. This means that each upstream narrowcast domain served by one RF port is provided in this example with four upstream channels, each detected by a burst receiver.

The lowband output signals of the diplexers are also tapped off by taps 368-1, 368-2, 368-3, 368-4, to be coupled to the four burst receivers of a DVB AG 190-5. Furthermore the four taps are further tapped to be RF summed at adder 310, then bandpass filtered by the BAND-PASS LEGACY SUB-BAND filter 314 and then applied on a DWDM upstream optical transmitter 58-1. This path supports legacy transmissions in the lowband, as the output signal of the DWDM optical transmitter 58-1 is sent to the head-end where legacy demodulators are used to detect the legacy transmissions.

The burst receiver output signals in each AG 190-1, 190-2, etc., are combined by a TDM multiplexer, and the TDM multiplexer outputs from all AGs are combined by the Ethernet multiplexer 346, implemented as GigaBit Ethernet in this example. One AG 190-5 is shown here as being of a DVB-RC/DAVIC type, while the other AGs 190-1, . . . , 190-4 are of the DOCSIS type. The output signal of the Ethernet multiplexer 346 drives an upstream optical transmitter 58-2, the optical output signal of which is sent to the head-end, possibly via another WDMH (WDM Hub) multiplexing stage. In this case optical transmitter 58-2 is of the DWDM type.

In the downstream path, another downstream optical fiber input 370 carries the subcarrier multiplexed analog broadcast and digital narrowcast signal into an optical receiver 29-1. The RF output signal of the optical receiver 29-1 is further split via two splitters 372-1, 372-2 to several locations: to the high frequency input terminals of the diplexers 59-1, 59-2, etc., to be injected downstream on each RF port, and to the input terminals of the CM demodulators and the settop demodulator of each AG 190-1, etc., to assist in the distributed synchronization and control protocol. Finally, a transponder interface 380 provides status monitoring and control for the entire DSN 366-1. The output signal of interface 380 feeds into the GigaBit Ethernet multiplexer 346 for upstream transmission over an upstream proprietary service overhead channel, whereas the input is provided from one of the CM demodulators, where the downstream proprietary service overhead channel is demultiplexed, and the MAC, packets are extracted as explained above.

In the downstream path, another downstream optical fiber input 370 carries the subcarrier multiplexed analog broadcast and digital narrowcast signal into an optical receiver 58-1. The RF output signal of the optical receiver 58-1 is further split via two splitters 372-1, 372-2 to several locations: to the high frequency input terminals of the diplexers 59-1, 59-2, etc., to be injected downstream on each RF port, and to the input terminals of the CM demodulators and the settop demodulator of each AG 190-1, etc., to assist in the distributed synchronization and control protocol. Finally, a transponder interface 380 provides status monitoring and control for the entire DSN 366-1. The output signal of interface 380 feeds into the GigaBit Ethernet multiplexer 346 for upstream transmission over an upstream proprietary service overhead channel, whereas the input is provided from one of the CM demodulators, where the downstream proprietary service overhead channel is demultiplexed, and the MAC, packets are extracted as explained above.

Other Networks

Figure 19:
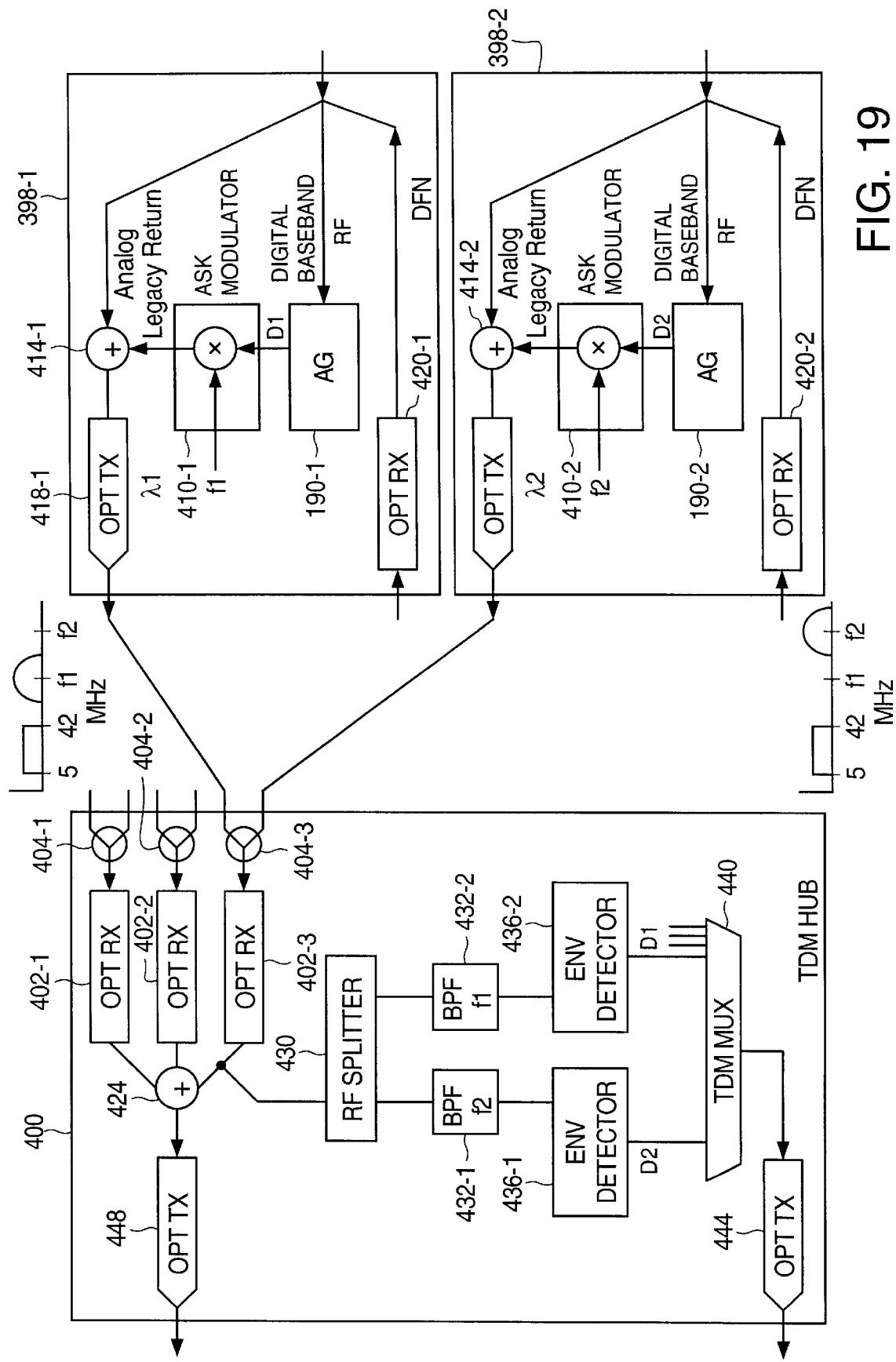
FIG. 19 shows a network with TDM hubs that economizes on optical components.
Figure 20:
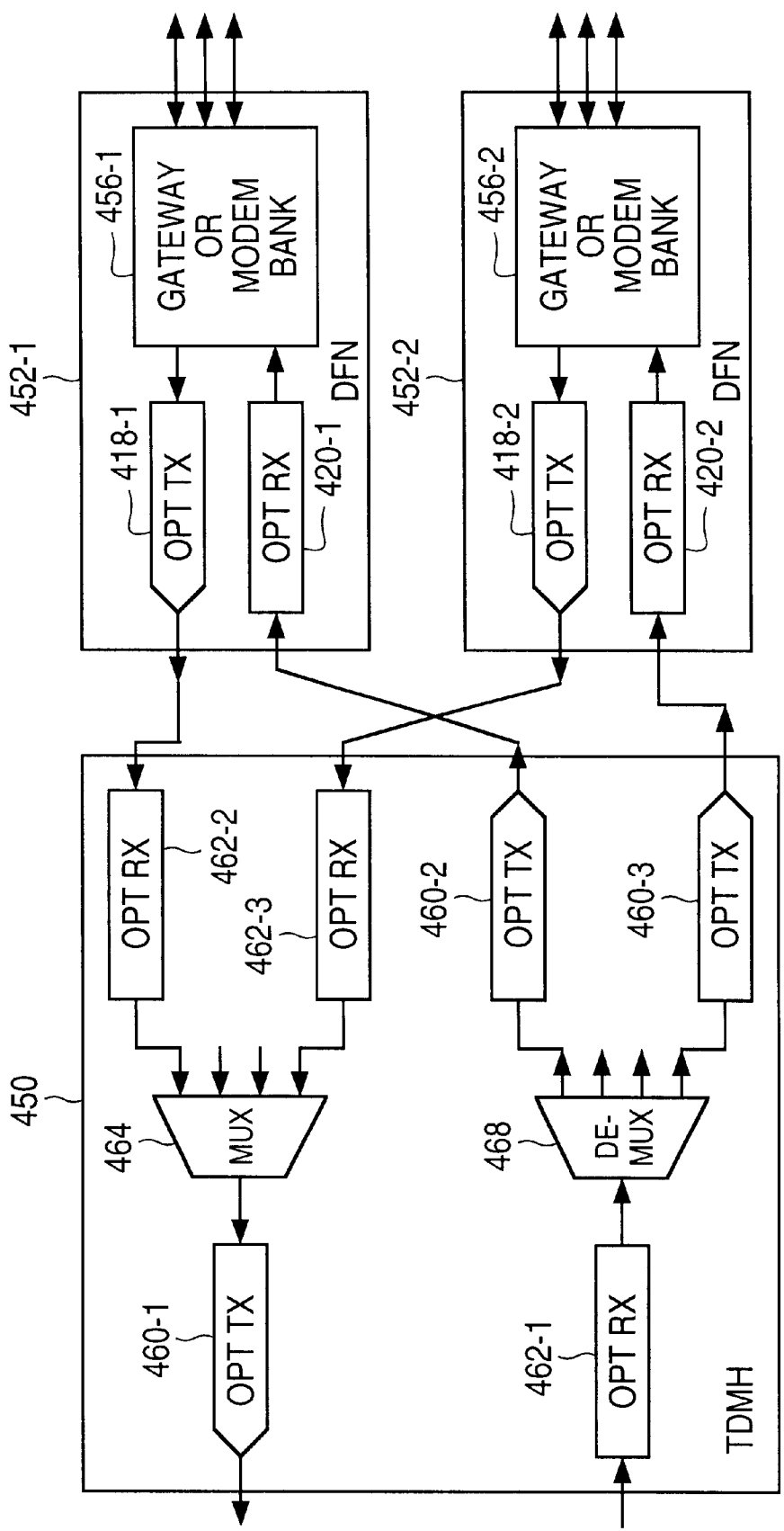
FIG. 20 shows another version of the FIG. 19 network.
Figure 21:
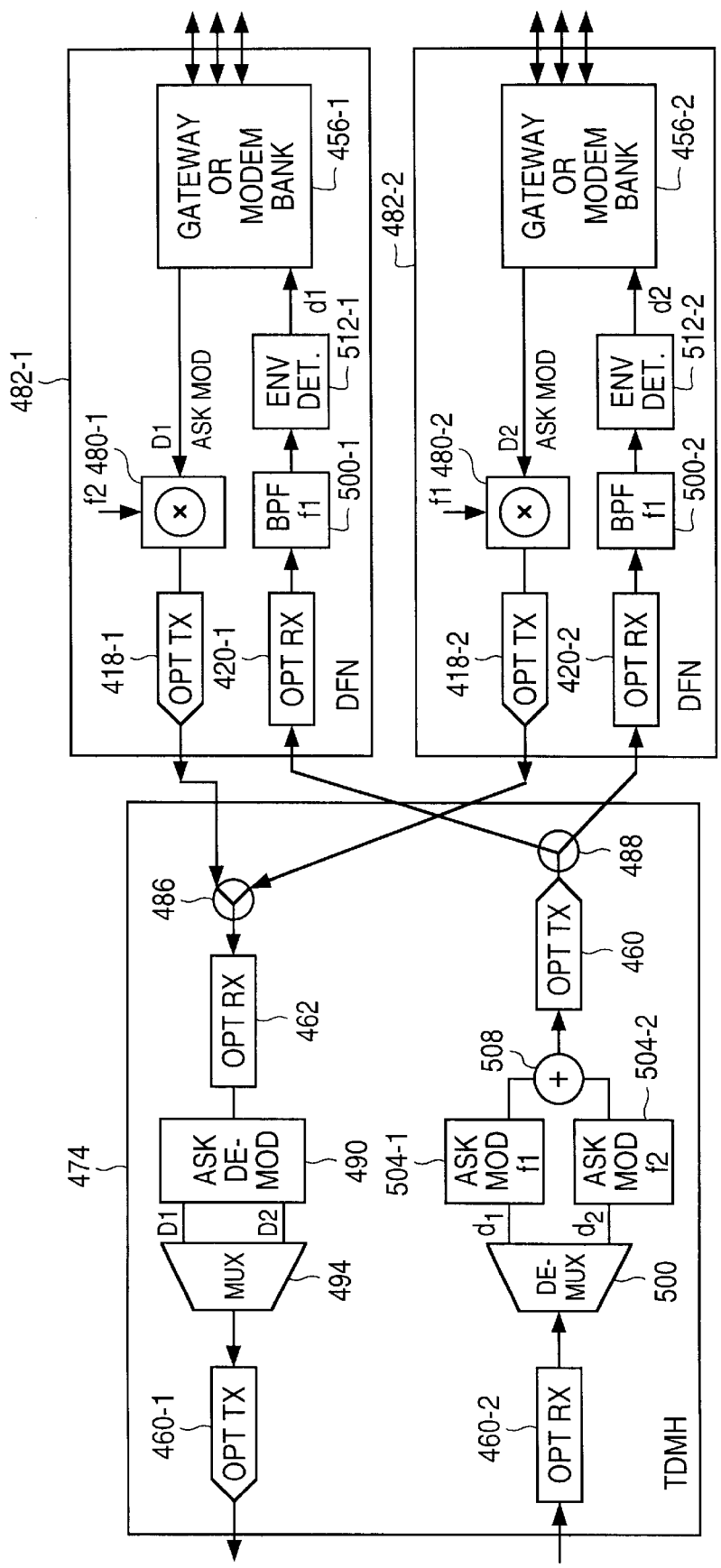
FIG. 21 shows yet another version of the FIG. 19 network.

Another aspect in accordance with the invention involves communication in the deep fiber networks between the deep fiber nodes and the TDM hub (TDMH). It is useful to economize on the number of return path optical receivers in the TDHM, and in some cases also reduce the number of upstream optical fibers coupling into the TDMH. The motivation is that the space inside the TDMH enclosures is limited and economy of scale is achieved when many deep fiber nodes are served by a single TDMH. Only relevant elements of the (modified) deep fiber nodes 398-1, 398-2 and TDMH 400 are shown in FIGS. 19, 20 and 21. For example, the downstream path in the TDMH 400 is omitted for simplicity and also omitted are the diplexers in DFNs 398.

FIG. 19 shows the case of mapping each M=2 deep fiber nodes 398-1, 398-2 together onto a single optical receiver 402-3 in the TDMH 400. Therefore, if N deep fiber nodes are served by the TDMH, then only M/N optical receivers 402-3 are needed to service those N deep fiber nodes. Practically, M is equal to 2 or 4, representing a significant saving of space and potentially of cost.

This network optically combines the M=2 deep fiber nodes' 398-1, 398-2 optical return path output signals using an optical combiner 404-1, 404-2, 404-3 coupled to each of the N/M receivers 402-1, 402-2, 402-3, and shifts the ASK modulation frequencies f1, f2 applied to each of the digital streams D1, D2, . . . , DM coming out of the interactive agents (AG) 190-1, 190-2 in each of the deep fiber nodes, such that the modulated RF spectra associated with the digital streams on each of the upstream optical fibers are disjointed in frequency. Each deep fiber node 398-1, 398-2 thus includes (as shown above) an ASK modulator 410-1, 410-2 coupled via RF summers 414-1, 414-2 to the respective optical transmitters 418-1, 418-2. Each deep fiber node also includes (as above) an optical receiver 420-1, 420-2.

Notice that combining of independent optical sources is used. To enable this it is necessary to utilize single mode lasers in the optical return path transmitters 418-1, 418-2 in each deep fiber node with wavelengths $\lambda 1, \lambda 2, \ldots, \lambda M$ such that the difference of any two optical frequencies exceeds the bandwidth of the associated optical receiver 402-3 in the TDMH 400 such that no interference is generated. (The relevant spectra from each transmitter 418-1, 418-2 are shown in the figure.) If M is small, e.g., 2 or 4, this requirement is readily accommodated, because commercially available DWDM (Dense Wavelength Division Multiplexing) lasers are designed to fit up to 16 wavelengths in the 1.5 $\mu$m transmission band, therefore accommodating 2 or 4 wavelengths is readily done. Notice that despite the usage of these "sparse" WDM lasers in transmitters 418-1, 418-2, no WDM passive optical components are used, only regular optical couplers/combiners.

This produces at the output terminal of each optical receiver 402-1, 402-2, 402-3 in the TDMH 400 an FDM spectrum signal including the superposition of the individual spectra generated at the return path output of each deep fiber node 398-1, 398-2.

The analog "legacy" (5 to 42 Mhz band in the US) return path signals (as described above) then superimpose in the RF summers 414-1, 414-2 to create a combined legacy return path signal (corresponding to the union of the narrowcast domains associated with the corresponding DFNs), which is applied to the input terminal of each of the optical transmitters 402-3, etc. of the TDMH.

The ASK spectra superimpose to create an FDM signal. The choice of the carrier frequencies f1, f2, . . . , fm, should be such that the ASK spectra are disjointed, which in the ASK case means that the frequency separation between adjacent frequencies should exceed twice the bitrate at the output terminal of the associated AG 190-1, etc. The frequency division multiplexed (FDM) signal at the output terminal of each optical receiver 402-1, 402-2, 402-3 is tapped before being input into the RF summer 424 (only the tap following optical receiver 402-3 is shown) and then the RF signal is split at splitter 430 and input into an ASK demodulator bank including M demodulators. Each demodulator consists of a bandpass filter (BPF) 432-1, 432-2 and an associated envelope detector 436-1, 436-2. The BPFs are tuned to the respective frequencies f1, f2, ..., fM.

The output signals of the envelope detectors 436-1, 436-2 belonging to a particular ASK demodulator bank associated with a given optical receiver reproduce the digital baseband signals D1, D2, ..., DM at the output terminals of the AGs 190-1, 190-2 in the deep fiber nodes 1, 2, ..., M, associated with the optical receiver 402-3. These digital signals are TDM multiplexed together at TDM multiplexer 440, which also multiplexes the digital outputs of the other ASK demodulator banks connected to the outputs of the other optical receivers 402-2, 402-3. The multiplexed signal output from TDM multiplexer 440 is transmitted upstream by optical transmitter 444, while the combined signal from summer 424 is transmitted by optical transmitter 448.

However, this has been done with a single optical receiver 402-1, rather than with M optical receivers, therefore, M-1 receivers are eliminated out of each of the M/N groups of M receivers.

To enable this, there is the particular choice of ASK carrier frequencies f1, f2, ..., fm in the deep fiber nodes (rather than having all the deep fiber nodes identically using the same ASK carrier frequency), the introduction of sparse WDM lasers which are sufficiently remote in wavelengths from one another, the introduction at the TDMH of optical combiners and RF splitters, and the tuning of the BPFs to the respective frequencies f1, f2, ..., fm.

The above enhancement for economizing upstream optical receivers by optical and FDM multiplexing of multiple digital signals from the deep fiber nodes is applicable to other transmission technologies, and to other solutions associated with a given transmission technology.

For example, instead of using an interactive agent, a small ITS (CMTS or INA) could be placed in the deep fiber node and then there would be need for two-way digital traffic between the deep fiber nodes and the TDMH. This is to be compared with the interactive agent architecture described above, wherein only digital upstream traffic is needed, as all downstream communication is over QAM channels operating over the RF cable downstream frequencies.

In cases where two way digital transmission is needed, the function of the TDMH is to multiplex the upstream digital signals as described above (though the sources of upstream digital signals are now "mini" CMTS rather than AG units), as well as to demultiplex the downstream digital signal arriving from the head-end at the TDMH, and cross-connect a specific digital signal to each of the deep fiber nodes connected to the TDMH.

Another network configuration where two-way digital communication may be needed between the TDMH and the deep fiber nodes is when the transmission medium to the HTs is not coaxial cable but rather a twisted pair (e.g., telephone lines). In such a network, each deep fiber node serves as a small DS0 telephony channel bank, or an xDSL remote terminal, multiplexing and demultiplexing the aggregate full-duplex digital signal transmitted from/to the TDHM, into a telephone channel bank or band of xDSL modems, feeding twisted pairs connected to customers' homes. Another type of network requiring two-way digital transmission is when some (or all) of the deep fiber nodes terminate at an enterprise where substantial full-duplex digital bandwidth is required for delivery over a conventional data LAN or WAN subnetwork. The deep fiber nodes can then serve as optical gateways to the LAN or WAN (local or wide area network) of each enterprise. In such cases (telephony, data LAN/WAN), no coaxial network is present, but the "deep" fiber architecture described above, including WDMH, TDMH and DFNs may be nevertheless used and extended to include downstream digital transmission to the DFNs, in addition to the upstream digital transmission.

In these types of networks (see FIG. 20) the TDMH 450 is coupled to deep fiber nodes 452-1, 452-2 and the AGs 190 described above in the deep fiber nodes are replaced by a Modem Bank or LAN/WAN Gateway 456-1, 456-2 that on one side couples to the input/output of a full-duplex digital signal channel running between each deep fiber node 452-1, 452-2 and the TDMH Ethernet links of a LAN or WAN. The modem bank is a group of telephony line cards or XDSL modems. The gateway is essentially a layer 2 bridge or layer 3 switch or router connecting on one side to the digital optical transmitter 418 and receiver 420 and on the other side to a data LAN/WAN, or more generally to any type of subnetwork on any type of transmission medium, be it twisted pair, wireless or coaxial cable. The two-way optical links between the multiple deep fiber nodes 452-1, 452-2 and the TDHM 450 are thereby to be economized on. In addition to the optical receivers and transmitters in the deep fiber nodes as in the previous figure, there are associated optical transmitters 460-2, 460-3 and receivers 462-2, 462-3 in TDMH 450. The associated upstream digital multiplexer 464, is used to combine the digital outputs of optical receivers 462-2, 462-3, etc., and the downstream digital demultiplexer 468 routes the signal to multiple downstream transmitters 460-2, 460-3, etc.

For networks that also need downstream digital transmission as described above, FIG. 21 discloses how to economize on downstream digital optical transmitters in the TDM hub (TDMH 474) and save space and cost and possibly reduce the number of fibers into the TDMH 474 when optical splitters can be eliminated. The upstream path is essentially as described above, with the digital upstream signal being ASK modulated prior to optical transmission by ASK modulators 480-1, 480-2 in deep fiber nodes 482-1, 482-2 and with the output signals of the M=2 deep fiber nodes 482-1, 482-2 being optically combined by combiner 486 onto a single optical receiver 462, the output signal from which then is coupled to an ASK demodulation bank 490 which separates out the digital upstream signals D1, D2, ..., DM. Signals D1, D2 are coupled by multiplexer 494 to optical transmitter 460-1.

In the downstream digital path, the output signals d1, d2, ..., dM at the output of the demultiplexer 500 in the TDMH 474 are each applied to a respective ASK modulator 504-1, 504-2. The output signals of the ASK modulators 504-1, 504-2 with respective carrier frequencies f1, f2, ..., fM, are RF summed at summer 508. Frequencies f1, f2 are chosen such that the ASK spectra are disjoint, after the summing, forming an FDM signal. This signal is transmitted to deep fiber nodes 482-1, 482-2. This arrangement is duplicated N/M times where N is the total number of deep fiber nodes per TDMH, i.e. N/M rather than N optical transmitters as are used in the TDMH.

In each deep fiber node 482-1, etc. the output signal of the optical receiver 420-1 is filtered by a bandpass filter 500-1 tuned to the associated frequency f1. This is followed by detection at envelope detector 512-1 to recover the baseband digital signal d1, originally injected into the ASK modulator 504-1 with center frequency f1 in the TDMH. This reduces the number of optical transmitters in the TDMH 474 by a factor of M. Furthermore, if the fiber splitters 486 and 488 can be taken out of the TDHM and placed into separate fiber management boxes, then the number of fibers to be handled in the TDMH is also reduced by a factor M.

Further, compared with the associated upstream system which economizes on optical receivers, this downstream economizing approach uses similar building blocks, namely ASK modems and bandpass filters, therefore it is efficient to implement, economizing on opto-electronics in both paths.

This disclosure is illustrative and not limiting; further modifications and variations will be apparent to one skilled in the art in light of this disclosure and are intended to fall within the scope of the appended claims.

We claim:

1. A network comprising:

a head-end;

at least one node coupled to the head-end by an optical fiber network;

at least one terminal coupled to the node by other than optical fiber, there being a return path via the node from the terminal to the head-end, the node including:

an optical receiver coupled between the optical fiber network and the terminal to carry signals from the head-end to the terminal; and in the return path, at least one optical transmitter coupled to the optical fiber network; and at least one burst receiver coupled between the optical transmitter and the terminal;

further comprising a hub apparatus coupled between the node and the head-end in the optical fiber network, the hub apparatus comprising:

a plurality of optical receivers, each optical receiver being coupled to an associated node;

a multiplexer having each of its input terminals coupled to an output terminal of one of the optical receivers;

an optical transmitter coupled between an output terminal of the multiplexer and the head-end; and wherein the hub apparatus further comprises an envelope detector coupled between each optical receiver and the associated multiplexer input terminal.

2. The network of claim 1, wherein the hub apparatus further comprises:

a second optical transmitter coupled to the optical fiber network; and a bandpass filter coupled between the second optical transmitter and the nodes.

3. The network of claim 1, further comprising at least one additional hub apparatus coupled in the optical fiber network between the head-end and the node, the additional hub apparatus being coupled to a plurality of nodes and comprising:

a multiplexer having a plurality of input ports each coupled to one of the hub apparatuses; and an optical amplifier coupled between the head-end and the nodes.

4. A network comprising:

a head-end;

at least one node coupled to the head-end by an optical fiber network;

at least one terminal coupled to the node by other than optical fiber, there being a return path via the node from the terminal to the head-end, the node including:

an optical receiver coupled between the optical fiber network and the terminal to carry signals from the head-end to the terminal; and in the return path, at least one optical transmitter coupled to the optical fiber network; and at least one burst receiver coupled between the optical transmitter and the terminal;

further comprising a hub apparatus coupled between the node and the head-end in the optical fiber network, the hub apparatus comprising:

a plurality of optical receivers, each optical receiver being coupled to an associated node;

a multiplexer having each of its input terminals coupled to an output terminal of one of the optical receivers; and an optical transmitter coupled between an output terminal of the multiplexer and the head-end;

wherein the hub apparatus further comprises:

a summer coupled to an output terminal of each of the optical receivers; and a plurality of demodulators coupled to the summer, wherein an output terminal of each of the demodulators is coupled to an input terminal of the multiplexer.

5. A hub apparatus for a network having a head-end coupled by an optical fiber network to the hub apparatus, the hub apparatus being coupled by optical fiber to a plurality of nodes, the hub apparatus comprising:

a plurality of optical receivers, each optical receiver being coupled to an associated one of the nodes;

a first multiplexer having each of its input terminals coupled to an output terminal of one of the optical receivers;

an output terminal coupled between an output terminal of the multiplexer and the optical fiber network;

an additional optical receiver coupled to the optical fiber network;

a demodulator coupled to the additional optical receiver;

a plurality of burst receivers, each coupled to one of the optical receivers;

interface circuitry coupled between the demodulator and a control terminal of each of the burst receivers; and a second multiplexer having each of its input terminals coupled to one of the burst receivers and its output terminal coupled to the first multiplexer.

* * * * *